(12) United States Patent  
Sakai

(10) Patent No.: US 8,375,071 B2  
(45) Date of Patent: Feb. 12, 2013

(54) FILE MANAGEMENT INFORMATION STORAGE APPARATUS AND METHOD AND PROGRAM FOR CONTROLLING THE SAME

(75) Inventor: Kenichiro Sakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 126 days.

(21) Appl. No.: 12/972,730

(22) Filed: Dec. 20, 2010

(65) Prior Publication Data

US 2011/0153693 A1   Jun. 23, 2011

(30) Foreign Application Priority Data

Dec. 22, 2009   (JP) ................................. 2009-290783

(51) Int. Cl.
*G06F 12/00*   (2006.01)
*G06F 17/00*   (2006.01)

(52) U.S. Cl. ...................................................... 707/823

(58) Field of Classification Search .................. None
See application file for complete search history.

(56) References Cited

U.S. PATENT DOCUMENTS 5,526,519 A * 6/1996 Maruyama et al. ................. 1/1
6,697,866 B1 * 2/2004 Arakawa et al. .............. 709/229

FOREIGN PATENT DOCUMENTS

JP   2003-280950 A   10/2003
JP   2007-200029 A    8/2007

* cited by examiner

*Primary Examiner* — Uyen T. Le
(74) *Attorney, Agent, or Firm* — Fujitsu Patent Center

(57) ABSTRACT

When an input-output request for file management information is inputted to a file management information storage apparatus, the input-output request is accepted by a file management section. A fixed-length area management section then inputs and outputs basic management information for managing a file corresponding to the input-output request to and from a fixed-length area of a storage unit as fixed-length data. In addition, a variable-length area management section inputs and outputs extended management information for managing the file corresponding to the input-output request to and from a variable-length area of the storage unit as variable-length data.

18 Claims, 19 Drawing Sheets

FILE MANAGEMENT INFORMATION STORAGE APPARATUS AND METHOD AND PROGRAM FOR CONTROLLING THE SAME

CROSS-REFERENCE TO RELATED APPLICATION

This application is based upon and claims the benefit of priority of the prior Japanese Patent Application No. 2009-290783, filed on Dec. 22, 2009, the entire contents of which are incorporated herein by reference.

FIELD

The embodiments discussed herein are related to a file management information storage apparatus and a method and program for controlling the file management information storage apparatus.

BACKGROUND

Directories and files are managed in a file system in a UNIX(trademark)-based OS (Operating System) by the use of file management information which is referred to as meta-data. The meta-data includes an inode, an extended attribute, and the like. A disk-based file system such as UFS (Unix File System) or ext3 (third extended file system) is known as such a file system.

An inode set is associated with a file or a directory and stores information regarding the file or the directory. In the case of a file, for example, file size, the number of a block in which data is stored, a time stamp, an access right, and the like are stored in an inode. In the case of a directory, the number of a block in which a directory entry is stored is stored in an inode. The directory entry is data for managing the name and inode number of each file in the directory. The directory entry is also included in the meta-data.

The size of an inode is fixed. Accordingly, additional information which cannot be stored in an inode is stored as an extended attribute in a disk area other than an inode. An extended attribute is information which is a combination of an attribute name and a value. For example, an ACL (Access Control List) used for managing a file access right is information which is added as an extended attribute. If an extended attribute is set, the number of a block in which the extended attribute is stored is stored in an inode.

By the way, a large-scale computer system includes a vast number of files and file access occurs frequently. Each time data in a file is accessed by a file system, access to meta-data and access to the actual data in the file occur. Accordingly, a technique for increasing the efficiency of file access by storing and managing the meta-data and the actual data in the file in different disk units and managing them is proposed. By storing the meta-data and the actual data in different disk units, the frequency of access to one disk unit can be decreased and file access speed in the entire system can be improved.

Japanese Laid-open Patent Publication No. 2003-280950
Japanese Laid-open Patent Publication No. 2007-200029

With conventional file systems, however, the size of an area in which an extended attribute is stored is fixed. This is the same with an inode. As a result, the extensibility of a file management function is limited. In the case of a large-scale system, for example, a vast number of users use the system. In this case, information indicative of a file access right for each user is set as an extended attribute. However, the size of an area which stores an extended attribute is fixed, so an amount by which information indicative of an access right can be stored has an upper limit. As a result, the number of users for which access rights can be set also has an upper limit. In the past, limits were set in this way on the extensibility of a file management function and proper file management suitable for a large-scale system could not be performed.

SUMMARY

According to an aspect of the present invention, there is provided a file management information storage apparatus for inputting and outputting file management information including a storage unit which has a fixed-length area for storing plural pieces of fixed-length data and a variable-length area for storing plural pieces of variable-length data, a file management section which accepts an input-output request for the file management information, a fixed-length area management section which inputs and outputs basic management information for managing a file corresponding to the input-output request to and from the fixed-length area of the storage unit as fixed-length data on the basis of the input-output request accepted by the file management section, and a variable-length area management section which inputs and outputs extended management information for managing the file corresponding to the input-output request to and from the variable-length area of the storage unit as variable-length data on the basis of the input-output request accepted by the file management section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
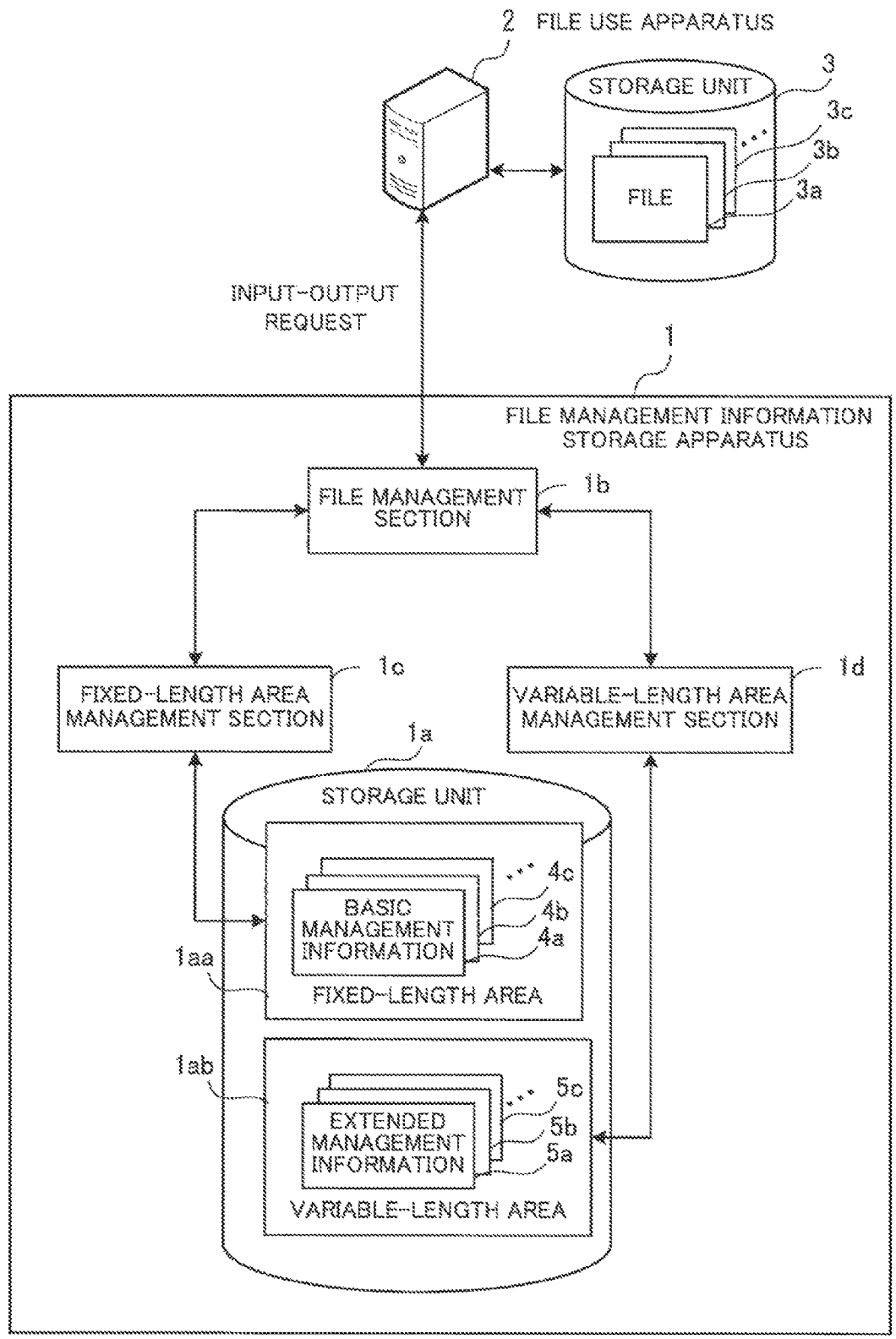
FIG. 1 is a block diagram which illustrates the function of a first embodiment.

Embodiments of the present invention will now be described with reference to the accompanying drawings, wherein like reference numerals refer to like elements throughout.

(First Embodiment)

FIG. 1 is a block diagram which illustrates the function of a first embodiment. In FIG. 1, a file management information storage apparatus 1 for inputting and outputting file management information is indicated. The file management information storage apparatus 1 stores and manages file management information used for managing files 3a, 3b, 3c, and so on stored in a storage unit 3 connected to a file use apparatus 2. The file management information is information which is referred to as meta-data in a file system in a UNIX(trademark)-based OS. The file management information includes basic management information 4a, 4b, 4c, and so on and extended management information 5a, 5b, 5c, and so on. For example, basic information, such as data size in a file, necessary for file management is stored as the basic management information 4a, 4b, 4c, and so on. The basic management information 4a, 4b, 4c, and so on are, for example, inodes. Information arbitrarily set, for example, for the purpose of improving the function of a file system is stored as the extended management information 5a, 5b, 5c, and so on. The extended management information 5a, 5b, 5c, and so on are, for example, the meta-data except the inodes.

The file management information storage apparatus 1 includes a storage unit 1a, a file management section 1b, a fixed-length area management section 1c, and a variable-length area management section 1d.

The storage unit 1a includes a fixed-length area 1aa for storing plural pieces of fixed-length data and a variable-length area 1ab for storing plural pieces of variable-length data. In this example, one storage unit 1a includes the fixed-length area 1aa and the variable-length area 1ab. However, a plurality of storage units may be prepared and the fixed-length area 1aa and the variable-length area 1ab may be set in different storage units. A HDD (Hard Disk Drive), a SSD (Solid State Drive), or the like can be used as the storage unit 1a.

The file management section 1b accepts an input-output request for file management information from the file use apparatus 2. For example, when the file use apparatus 2 opens a file in the storage unit 3, the file use apparatus 2 makes an input-output request for the file to the file management information storage apparatus 1.

The fixed-length area management section 1c inputs the basic management information 4a, 4b, 4c, or the like for managing the file corresponding to the input-output request to or outputs the basic management information 4a, 4b, 4c, or the like for managing the file corresponding to the input-output request from the fixed-length area 1aa of the storage unit 1a as fixed-length data on the basis of the input-output request accepted by the file management section 1b.

The variable-length area management section 1d inputs extended management information for managing the file corresponding to the input-output request to or outputs extended management information for managing the file corresponding to the input-output request from the variable-length area 1ab of the storage unit 1a as variable-length data on the basis of the input-output request accepted by the file management section 1b.

When the input-output request for the file management information is inputted from the file use apparatus 2 to the above file management information storage apparatus 1, the input-output request is accepted by the file management section 1b. The basic management information for managing the file corresponding to the input-output request is then inputted to or outputted from the fixed-length area 1aa of the storage unit 1a as fixed-length data by the fixed-length area management section 1c. In addition, the extended management information for managing the file corresponding to the input-output request is inputted to or outputted from the variable-length area 1ab of the storage unit 1a as variable-length data by the variable-length area management section 1d.

The extended management information for the file is inputted to or outputted from the storage unit 1a in this way as variable-length data. As a result, the data size of the extended management information can be increased on the basis of a function necessary to the system and the extensibility of a file management function improves. By increasing the data size of the extended management information, for example, an extended attribute regarding the access rights of many users can be stored as the extended management information.

In addition, the extended management information is variable-length data, so the data size of the extended management information can be minimized. That is to say, if the extended management information is fixed-length data, the data size of all the extended management information is increased in order to enhance the extensibility of the file system. In this case, the data size of extended management information in which pieces of information registered is not very numerous is also increased. This decreases the efficiency of the use of the storage unit 1a. In other words, making extended management information variable-length data improves the efficiency of the use of the storage unit 1a.

The fixed-length area management section 1c can divide the basic management information into a plurality of groups (basic management information groups) and store the basic management information in different storage units by basic management information group. By doing so, the speed of access to the basic management information can be increased.

In addition, the variable-length area management section 1d can divide the extended management information into a plurality of groups (extended management information groups) and store the extended management information in different storage units by extended management information group. By doing so, the speed of access to the extended management information can be increased.

(Second Embodiment)

A second embodiment will now be described in detail. In the second embodiment each of a fixed-length area and a variable-length are distributed and set in a plurality of disk units in order to realize both improvement in the extensibility of a file management function and an increase in the speed of access to file management information (enhancement of throughput by parallel I/O).

Figure 2:
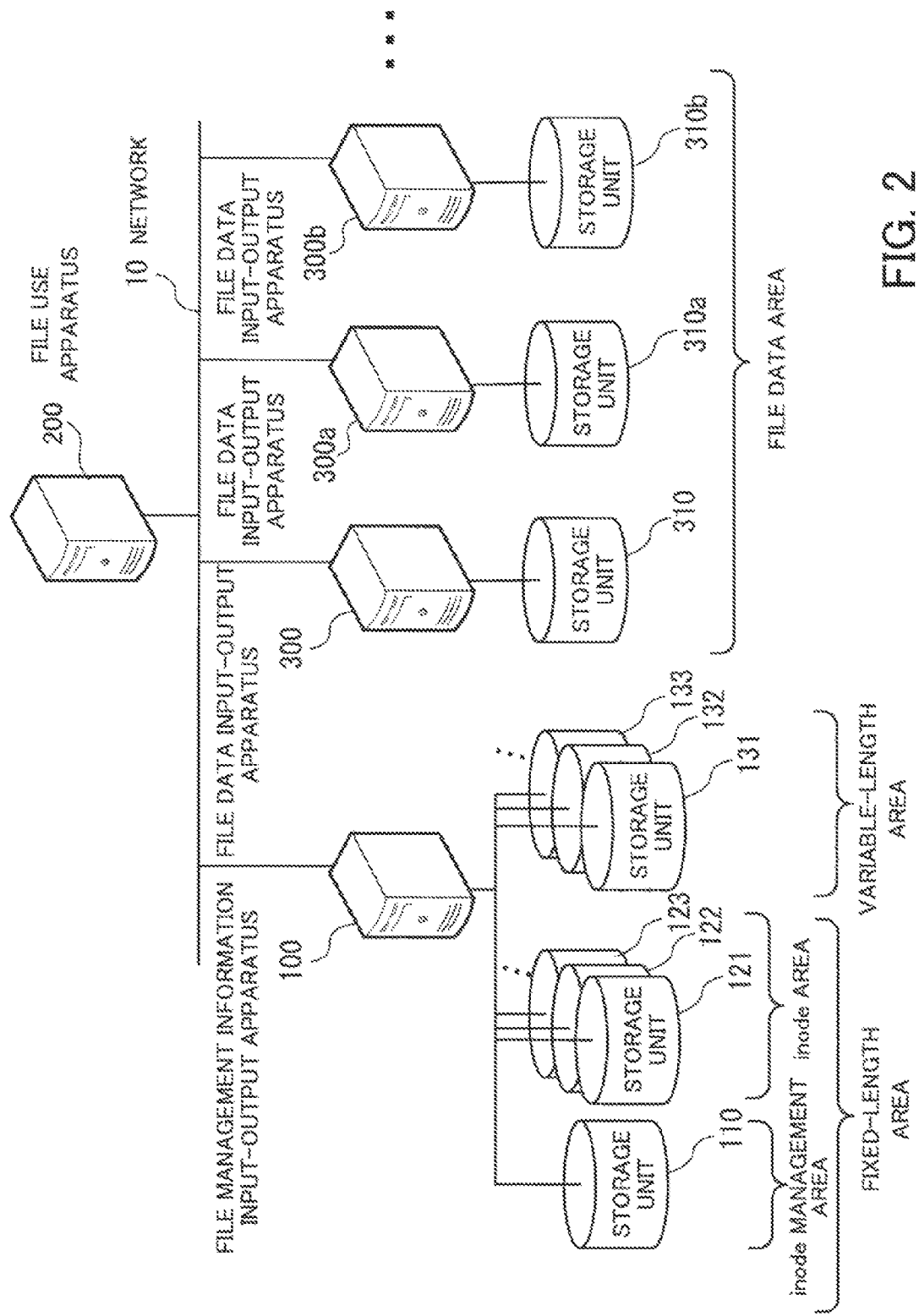
FIG. 2 illustrates an example of the system configuration of a second embodiment.

FIG. 2 illustrates an example of the system configuration of the second embodiment. A file use apparatus 200 is connected to a file management information input-output apparatus 100 and a plurality of file data input-output apparatus 300, 300a, 300b, and so on via a network 10.

The file use apparatus 200 executes an application program in response to a request from a user. Hereinafter a function realized by executing an application program will be referred to as a user application. When file manipulation is performed on the basis of the user application, the file use apparatus 200 performs a process regarding meta-data, such as opening a file, creating a file, storing an extended attribute, or making a request to acquire an extended attribute, with the file management information input-output apparatus 100. In addition, the file use apparatus 200 performs the reading or writing of actual file data with the file data input-output apparatus 300, 300a, 300b, and so on.

Only one file use apparatus 200 is indicated in the system of FIG. 2. However, a plurality of file use apparatus 200 can be connected to the network 10. For example, if a large-scale operation process is performed in parallel, a plurality of file use apparatus 200 are connected to the network 10. In this case, the file management information input-output apparatus 100 accepts an input-output request for file management information from each file use apparatus 200.

The file management information input-output apparatus 100 receives a request regarding file manipulation, such as a file open request, from the file use apparatus 200 and performs the process of inputting or outputting meta-data in response to the request. A plurality of storage units 110, 121, 122, 123, . . . , 131, 132, 133, and so on are connected to the file management information input-output apparatus 100 for managing meta-data. A system manager ensures a fixed-length area and a variable-length area in the plurality of storage units 110, 121, 122, 123, . . . , 131, 132, 133, and so on. The fixed-length area is a storage area for storing plural pieces of fixed-length data. The variable-length area is a storage area for storing plural pieces of variable-length data. To be concrete, the system manager inputs the setting of storage units used as the fixed-length area and storage units used as the variable-length area to the file management information input-output apparatus 100.

In this example, storage areas in the storage units 110, 121, 122, 123, and so on are ensured as the fixed-length area and storage areas in the storage units 131, 132, 133, and so on are ensured as the variable-length area. The fixed-length area is divided into an inode management area for storing a bit map used for managing the use or nonuse of inodes by inode number and an inode area for storing the inodes by inode number.

It is possible to make the file management information input-output apparatus 100 ensure the fixed-length area and the variable-length area automatically. For example, the file management information input-output apparatus 100 uses one of a plurality of storage units connected thereto at the time of beginning system operation as the inode management area. In addition, the file management information input-output apparatus 100 divides the other storage units into two groups, uses one group as the inode area, and uses the other group as the variable-length area.

The storage units 110, 121, 122, 123, and so on are used as the fixed-length area. The fixed-length area is divided into the inode management area and the inode area. The storage unit 110 is used as the inode management area and the storage units 121, 122, 123, and so on are used as the inode area.

The storage units 131, 132, 133, and so on are used as the variable-length area. The variable-length area stores meta-data (such as an extended attribute) except an inode in a file system. The data size of data stored in the variable-length area is variable. In the second embodiment information stored in the variable-length area is managed by the file. A file in the variable-length area is managed by a file system included in each of the storage units 131, 132, 133, and so on. Hereinafter a file in the variable-length area will be referred to as a "meta-data file" and be distinguished from a file in which actual data is stored in a file data area.

The file management information input-output apparatus 100 inputs meta-data to or outputs meta-data from the storage units 110, 121, 122, 123, . . . , 131, 132, 133, and so on in response to a file access request from the file use apparatus 200. For example, when a file open request is inputted from the file use apparatus 200, the file management information input-output apparatus 100 specifies an inode number from a path to a file and a file name designated in the request. The path to the file is indicated by an array made up of the names of the topmost (root) directory through a directory to which the file belongs. Hereinafter information in which the name of a file follows a path indicative of a place where the file is will be referred to as a "pathname."

The file management information input-output apparatus 100 which specifies the inode number in response to the file open request acquires meta-data corresponding to the specified inode number from the storage units 110, 121, 122, 123, . . . , 131, 132, 133, and so on. The file management information input-output apparatus 100 then performs a file open process by the use of the acquired meta-data. The file management information input-output apparatus 100 informs the file use apparatus 200 of a processing result.

Each of the file data input-output apparatus 300, 300a, 300b, and so on inputs file data (actual data to be stored in a file) to or outputs file data (actual data stored in a file) from a storage unit 310, 310a, 310b, or the like in response to a request from the file use apparatus 200. The storage units 310, 310a, 310b, and the like are used as a file data storage area (file data area). To be concrete, each of the file data input-output apparatus 300, 300a, 300b, and so on writes file data to a storage unit in response to a file write request from the file use apparatus 200. In addition, each of the file data input-output apparatus 300, 300a, 300b, and so on reads out file data from a storage unit in response to a read request from the file use apparatus 200. A request sent from the file use apparatus 200 includes offset information for a position from which a file is read out or to which a file is written and data length. Furthermore, a file write request includes data to be written.

The function of the file management information storage apparatus 1 illustrated in FIG. 1 is realized by the file management information input-output apparatus 100 and the plurality of storage units 110, 121, 122, 123, . . . , 131, 132, 133, and so on.

For example, a HDD or a SSD can be used as each of the storage units 110, 121, 122, 123, . . . , 131, 132, 133, . . . , 310, 310a, 310b, and so on. In addition, each of the storage units 110, 121, 122, 123, . . . , 131, 132, 133, . . . , 310, 310a, 310b, and so on may be a RAID (Redundant Array of Inexpensive Disks) including a plurality of HDDs.

Figure 3:
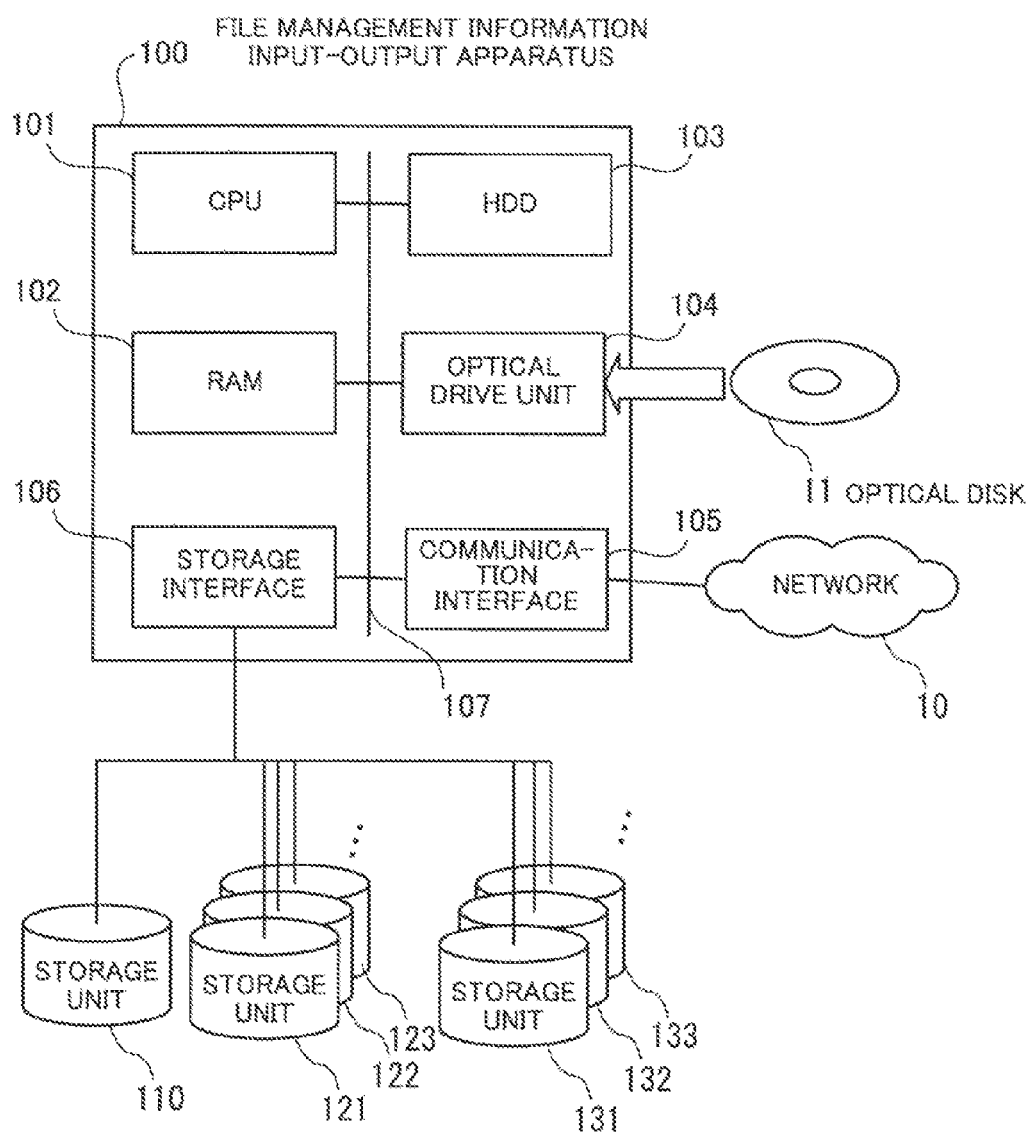
FIG. 3 illustrates an example of the hardware configuration of a file management information input-output apparatus used in the second embodiment.

FIG. 3 illustrates an example of the hardware configuration of the file management information input-output apparatus used in the second embodiment. The whole of the file management information input-output apparatus 100 is controlled by a CPU (Central Processing Unit) 101. A RAM (Random Access Memory) 102 and a plurality of peripheral devices are connected via a bus 107 to the CPU 101 which is an operation processing unit.

The RAM 102 is used as a main memory of the file management information input-output apparatus 100. The RAM 102 temporarily stores at least part of an OS (operating system) or an application program executed by the CPU 101. The RAM 102 also stores various pieces of data which the CPU 101 needs to perform a process.

An HDD 103, an optical drive unit 104, a communication interface 105, and a storage interface 106 are connected to the CPU 101 as peripheral devices.

The HDD 103 stores the OS which controls the file management information input-output apparatus 100 and application programs each of which makes the file management information input-output apparatus 100 perform a file management information input-output process.

The optical drive unit 104 reads data recorded on an optical disk 11 by the use of a laser beam or the like. The optical disk 11 is a portable record medium data on which can be read by the reflection of light. The optical disk 11 is a DVD (Digital Versatile Disk), a DVD-RAM, a CD-ROM (Compact Disk Read Only Memory), a CD-R(Recordable)/RW(ReWritable), or the like.

The communication interface 105 is connected to a network 10. The communication interface 105 exchanges data with other computers including the file use apparatus 200 via the network 10.

The storage interface 106 controls inputting data to or outputting data from the plurality of storage units 110, 121, 122, 123, . . . , 131, 132, 133, and so on.

By adopting the above-mentioned hardware configuration, the processing function of this embodiment can be realized. FIG. 3 illustrates an example of the hardware configuration of the file management information input-output apparatus 100. However, the file use apparatus 200 and the file data input-output apparatus 300, 300a, 300b, and so on can also be realized by adopting the same hardware configuration.

Figure 4:
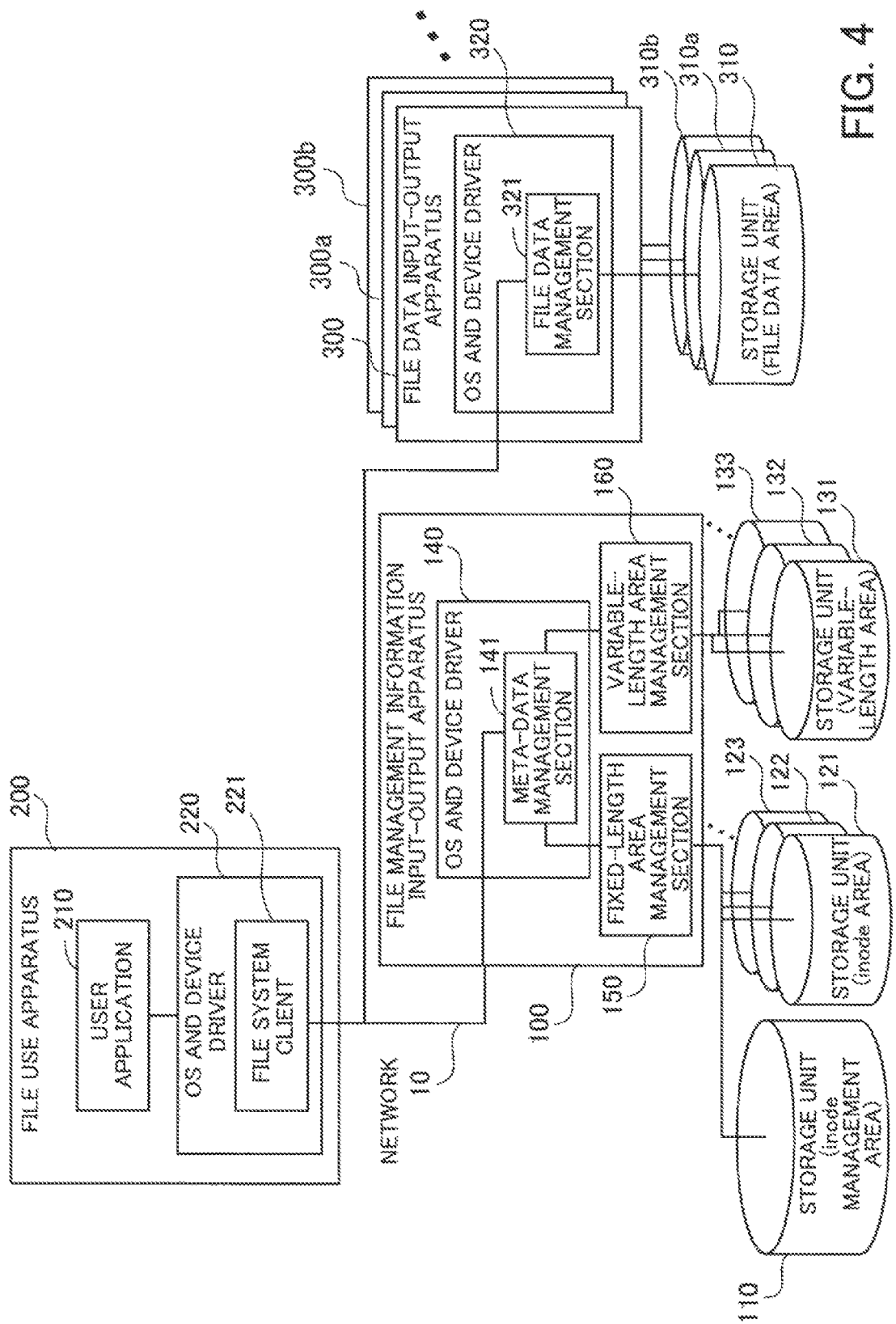
FIG. 4 is a block diagram which illustrates the function of each apparatus in the second embodiment.

FIG. 4 is a block diagram which illustrates the function of each apparatus in the second embodiment. The file use apparatus 200 includes a user application 210 and an OS and device driver 220. The user application 210 performs a process, such as a calculation process, in response to a request from a user. The user application 210 is a function. A CPU included in the file use apparatus 200 executes the application program stored in a HDD included in the file use apparatus 200. By doing so, the function is realized.

The OS and device driver 220 controls hardware of the file use apparatus 200. The OS and device driver 220 has the function of creating a process for performing the user application 210 and the function of controlling peripheral devices connected to the file use apparatus 200. The OS and device driver 220 has the function of performing a multiprocess and can simultaneously create a plurality of processes for performing the user application 210.

In addition, the OS and device driver 220 includes a file system client 221. The file system client 221 performs file manipulation via the network 10. For example, the file system client 221 sends the file management information input-output apparatus 100 an open request in which a file name is designated in response to a file open request from the user application 210. The file system client 221 then receives the result of the process of opening the corresponding file from the file management information input-output apparatus 100. The result of the process of opening the file includes, for example, meta-data such as an inode of the opened file. The result of the process of opening the file includes an identifier of a file data input-output apparatus in which file data is stored, information indicative of a location in a storage unit of the file data input-output apparatus at which the file data is stored, and the like. On the basis of the information acquired from the file management information input-output apparatus 100, the file system client 221 acquires the file data in the opened file from the file data input-output apparatus, and passes it to the user application 210.

The file management information input-output apparatus 100 includes an OS and device driver 140, a fixed-length area management section 150, and a variable-length area management section 160. The OS and device driver 140 controls hardware of the file management information input-output apparatus 100. The OS and device driver 140 has the function of controlling peripheral devices connected to the file management information input-output apparatus 100.

In addition, the OS and device driver 140 includes a meta-data management section 141. The meta-data management section 141 manages meta-data stored in the storage units 110, 121, 122, 123, . . . , 131, 132, 133, and so on. To be concrete, the meta-data management section 141 receives a request regarding the meta-data, such as a file open request, from the file use apparatus 200 via the network 10, performs a process in response to the request, and sends a client node a processing result. For example, in response to a file open request from the file system client 221 of the file use apparatus 200, the meta-data management section 141 performs the process of opening a file designated in the file open request. The meta-data management section 141 then sends the file use apparatus 200 a processing result including meta-data on the opened file.

The meta-data management section 141 accesses the meta-data stored in the storage units 110, 121, 122, 123, . . . , 131, 132, 133, and so on via the fixed-length area management section 150 and the variable-length area management section 160. To be concrete, the meta-data management section 141 accesses an inode via the fixed-length area management section 150. In addition, the meta-data management section 141 accesses the meta-data except inodes via the variable-length area management section 160. The meta-data except the inodes includes an extended attribute of a file or a directory, a directory entry, an ACL, and the like.

The fixed-length area management section 150 manages data stored in a fixed-length area set in the storage units 110, 121, 122, 123, and so on. To be concrete, the fixed-length area management section 150 set an inode management area in the storage unit 110 and stores inode management information in it. inode management information is information in a bit map format for managing the use or nonuse of an inode corresponding to each inode number. In addition, the fixed-length area management section 150 sets a fixed-length inode area in the storage units 121, 122, 123, and so on and stores an inode in it.

The variable-length area management section 160 manages data stored in a variable-length area set in the storage units 131, 132, 133, and so on. To be concrete, the variable-length area management section 160 stores the meta-data except the inodes in the variable-length area set in the storage units 131, 132, 133, and so on.

In the second embodiment the meta-data except the inodes is stored in one or more files and is managed. That is to say, the variable-length area management section 160 functions as one file system and manages a meta-data file in the storage units 131, 132, 133, and so on. For example, the variable-length area management section 160 can manage a meta-data file by a file system called ext2 (second extended file system). Hereinafter a file system function which the variable-length area management section 160 has will be referred to as a "meta-data management file system."

The file data input-output apparatus 300 includes an OS and device driver 320. The OS and device driver 320 includes a file data management section 321. The OS and device driver 320 has the function of controlling peripheral devices connected to the file data input-output apparatus 300. The file data management section 321 manages file data stored in the storage unit 310. For example, in response to a request from the file system client 221 of the file use apparatus 200 to acquire file data, the file data management section 321 acquires the file data at a location in the storage unit 310 designated in the request. The file data management section 321 then sends the file use apparatus 200 the acquired file data.

The other file data input-output apparatus 300*a*, 300*b*, and so on have the same function as the file data input-output apparatus 300 has.

In the second embodiment, as illustrated in FIG. 4, the inodes and the meta-data except the inodes included in one file system are distributed and managed.

Figure 5:
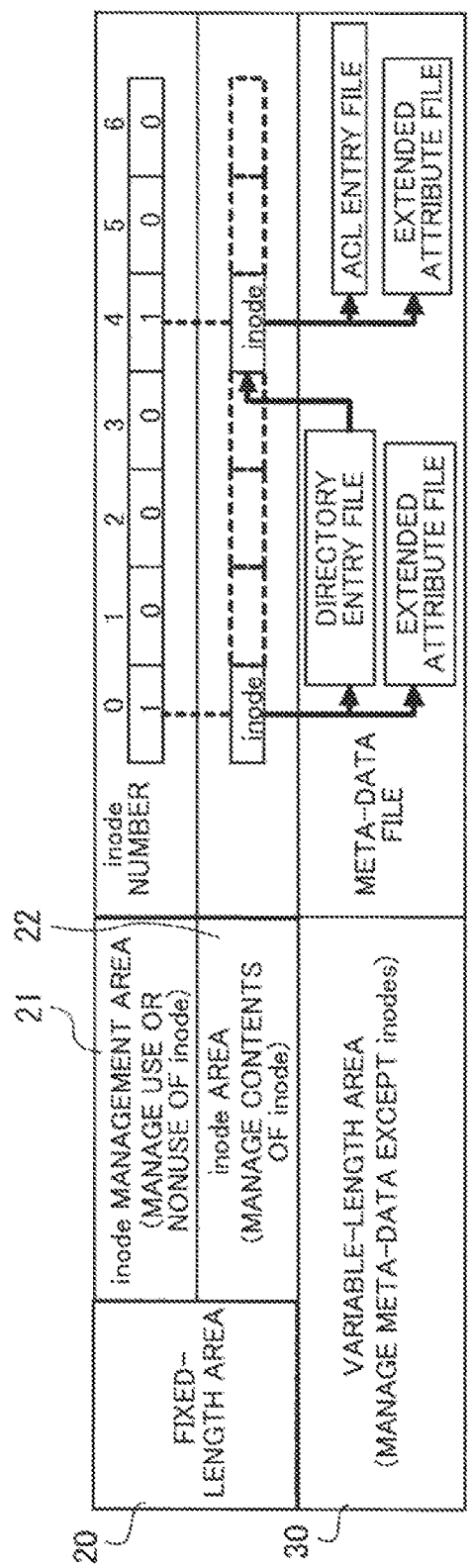
FIG. 5 illustrates how meta-data is distributed and managed.

FIG. 5 illustrates how the meta-data is distributed and managed. The meta-data management section 141 performs the distribution and management of the meta-data illustrated in, for example, FIG. 5. That is to say, the meta-data management section 141 divides a storage area of the storage units 110, 121, 122, 123, ..., 131, 132, 133, and so on used for storing the meta-data included in the file system into a fixed-length area 20 and a variable-length area 30. The meta-data management section 141 stores a fixed-length inode array and management data for managing the state of the use of each inode in the fixed-length area 20. The meta-data management section 141 stores the meta-data except the inodes in the variable-length area 30 and manages the meta-data except the inodes by associating it with the inodes.

To be concrete, the fixed-length area 20 is divided into an inode management area 21 and an inode area 22. The management data which indicates the use or nonuse of an inode in the bit map format is stored in the inode management area 21. In this example, each of bits arranged in a row indicates the use or nonuse of the corresponding inode. Inode numbers which are incremented by one are assigned to these bits from the left in order. The value of each bit means the use or nonuse of an inode indicated by an inode number assigned thereto. In this example, the bit value "0" means that a corresponding inode is not used, and the bit value "1" means that a corresponding inode is used.

An inode array is stored in the inode area 22. The inode array includes a plurality of inodes arranged in a row in order of inode number. Each inode includes file length (size), ID of a unit which stores a file, user ID of an owner of the file, group ID of the file, an inode number, and the like.

The variable-length area 30 is used for managing the meta-data except the inodes. A meta-data file to which meta-data except the inodes is written is stored in the variable-length area 30. Each meta-data file is associated with an inode number. For example, an inode number is included in the name of a meta-data file. For example, a directory entry file or an extended attribute file is a meta-data file corresponding to a directory. The name of a file included in a directory is stored in a directory entry file. Extended attribute information for a directory is stored in an extended attribute file. For example, an ACL entry file or an extended attribute file is a meta-data file corresponding to a file. Information regarding a limitation on access to a file is stored in an ACL entry file. Extended attribute information for a file is stored in an extended attribute file.

The name and inode number of a file included in a directory are set in a directory entry file. If a lower directory is included in the directory, the name and inode number of the lower directory are set in the directory entry file. In order to access a file, directory entry files are followed along a path to the file. By doing so, meta-data in the file to be accessed can be acquired.

In addition, the inode area and the variable-length area are grouped by the meta-data management section 141 and are distributed and set in a plurality of storage units.

Figure 6:
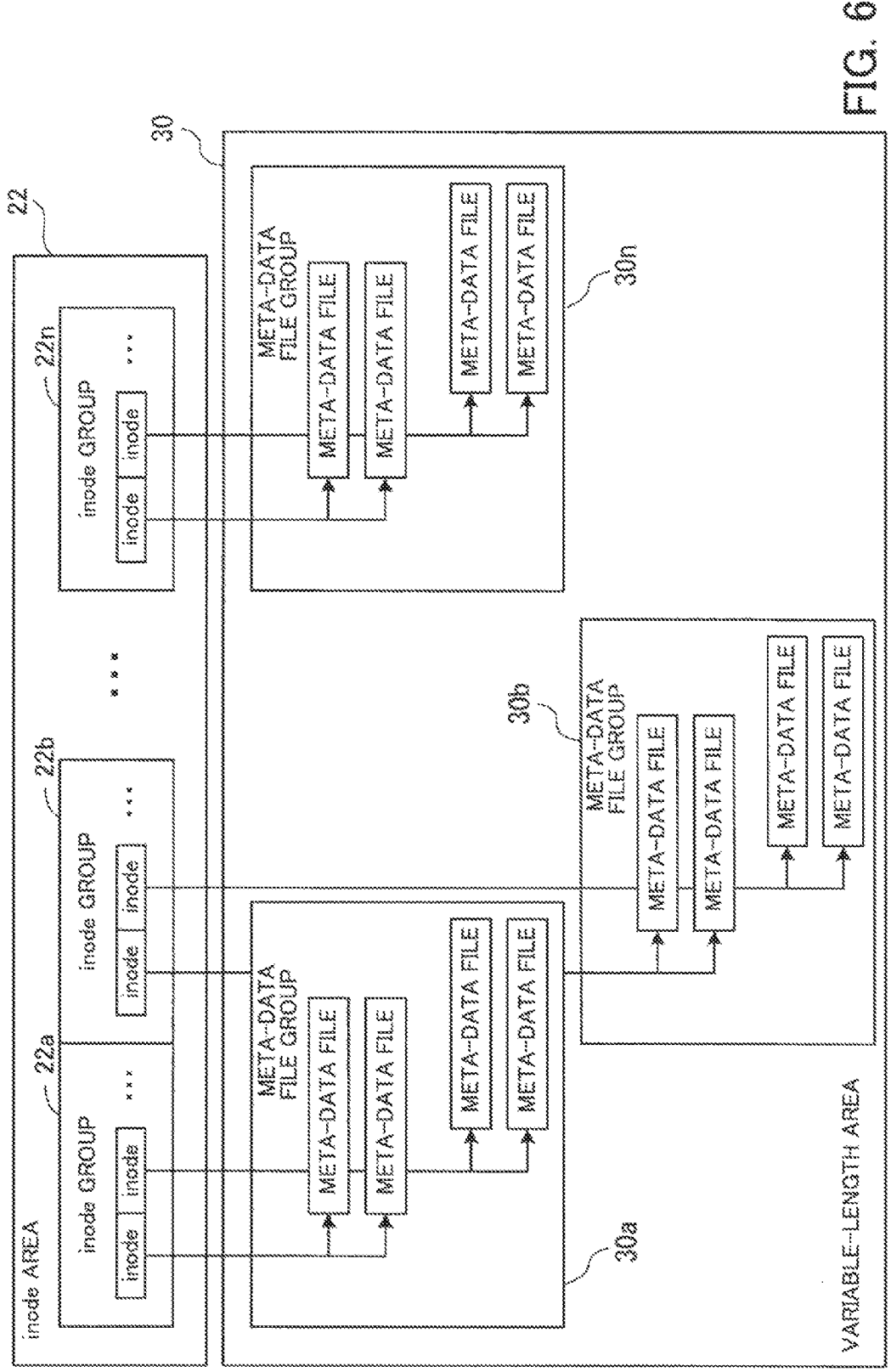
FIG. 6 illustrates how an inode area and a variable-length area are grouped.

FIG. 6 illustrates how the inode area and the variable-length area are grouped. The meta-data management section 141 groups inodes in the inode area 22 of the fixed-length area 20 into inode groups 22*a*, 22*b*, ..., and 22*n*. Each of the inode groups 22*a*, 22*b*, ..., and 22*n* includes inodes which belongs thereto. The inode groups 22*a*, 22*b*, ..., and 22*n* are stored in different storage units. inodes which belong to one inode group are stored in one or more storage units.

In addition, meta-data files in the variable-length area 30 are grouped into meta-data file groups 30*a*, 30*b*, ..., and 30*n*. The meta-data file groups 30*a*, 30*b*, ..., and 30*n* are associated with the inode groups 22*a*, 22*b*, ..., and 22*n* on a one-to-one basis. Meta-data files associated with inode numbers which are the same as inode numbers of inodes in the corresponding inode groups 22*a*, 22*b*, ..., and 22*n* are stored in the meta-data file groups 30*a*, 30*b*, ..., and 30*n* respectively. Meta-data except the inodes regarding files or directories indicated by the inode numbers is written to the meta-data files. The meta-data file groups 30*a*, 30*b*, ..., and 30*n* are stored in different storage units. Meta-data files which belong to one meta-data file group are stored in one or more storage units.

A method for generating a pathname for a meta-data file will now be described. In the second embodiment a pathname for a meta-data file is generated on the basis of the inode number of the meta-data file.

Figure 7:
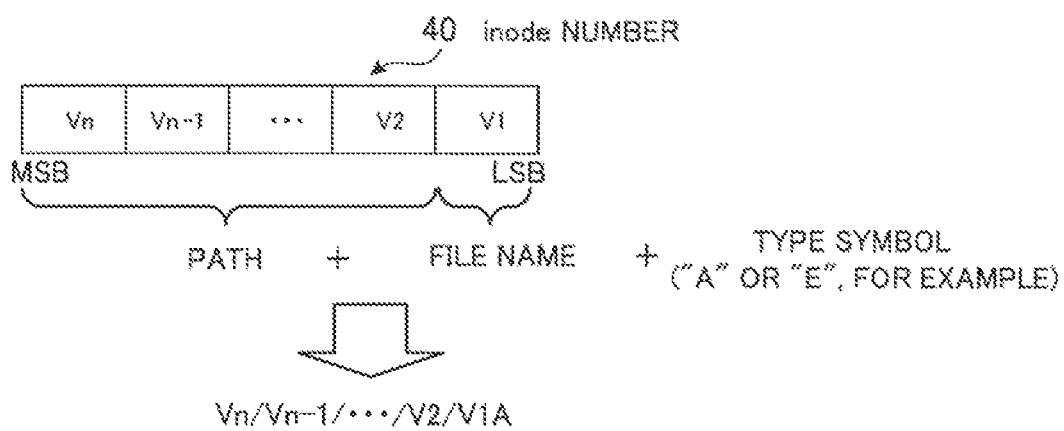
FIG. 7 indicates a pathname for a meta-data file generated on the basis of an inode number.

FIG. 7 indicates a pathname for a meta-data file generated on the basis of an inode number. The meta-data management section 141 manages a meta-data file which stores meta-data except the inodes in a directory structure hierarchically formed by the use of a directory name and a file name associated with the inode number "40." Accordingly, the meta-data management section 141 determines a pathname for the meta-data file corresponding to the inode number "40" on the basis of the inode number "40."

To be concrete, data which indicates the inode number "40" is divided into n (positive integer) parts. It is assumed that values (divided values) obtained by the division are Vn, Vn−1, ..., V2, and V1 from the MSB (Most Significant Bit) side of the data which indicates the inode number "40." The divided values Vn, Vn−1, ..., V2, and V1 may not be equal in bit length. For example, the bit length of the divided value Vn is 4 bits and the bit length of the other divided values Vn−1, ..., V2, and V1 is 16 bits.

The meta-data management section 141 uses the divided values Vn through V2 as a directory name for each hierarchy in the hierarchical directory structure. In addition, the meta-data management section 141 gives a combination of the divided value V1 and a type symbol as a file name. A type symbol indicates the type of the contents of a meta-data file. For example, if a meta-data file is an ACL entry file, then the type symbol "A" is given. If a meta-data file is an extended attribute file, then the type symbol "E" is given.

The meta-data management section 141 can group the inodes by a divided value Vk for an arbitrary hierarchy. For example, the meta-data management section 141 can make inode numbers in which the numeric value of the divided value Vk for the arbitrary hierarchy is the same belong to the same inode group.

Figure 8:
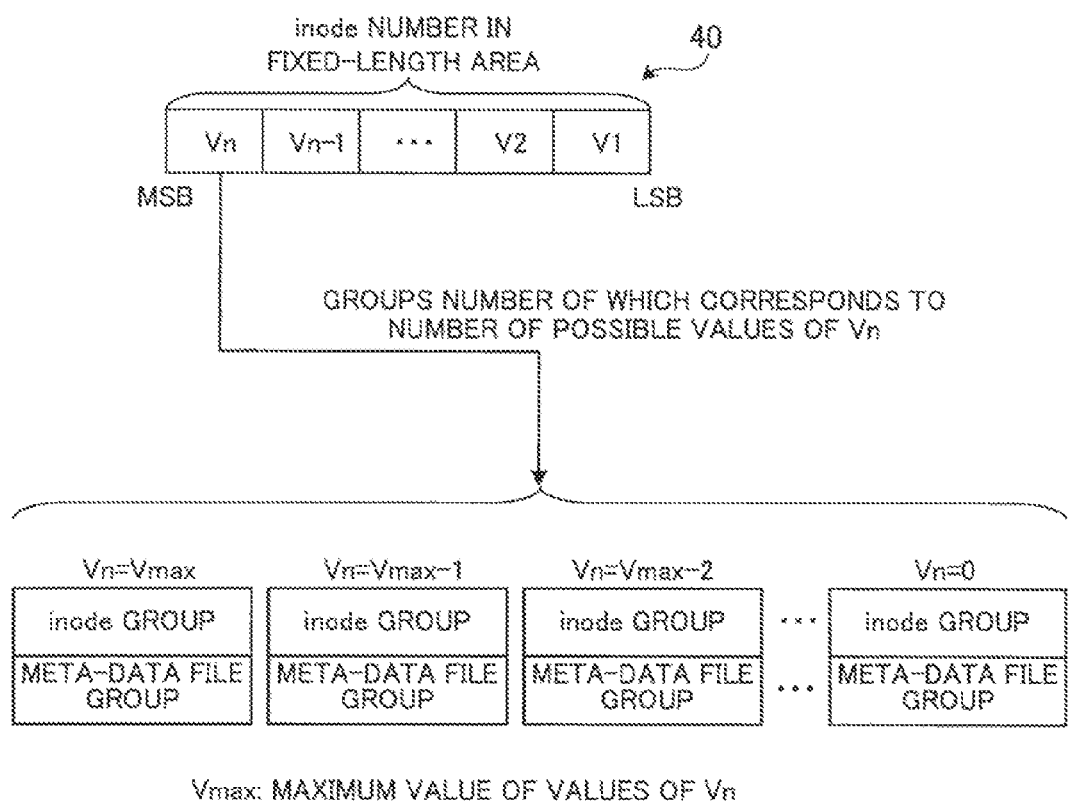
FIG. 8 illustrates an example of grouping performed by the use of a value obtained by dividing an inode number.

FIG. 8 illustrates an example of grouping performed by the use of a value obtained by dividing an inode number. FIG. 8 illustrates the case where the divided value Vn for the topmost hierarchy is used for grouping. If the divided value Vn is used for grouping, groups the number of which corresponds to the number of possible values of Vn can be formed. It is assumed that the maximum value of Vn is Vmax. Then possible values of Vn are, for example, 0 through Vmax and (Vmax+1) inode groups can be formed. A meta-data file group corresponding to each inode group is formed.

As stated above, the number of groups depends on the bit number of a divided value used for grouping. For example, if grouping is performed by the use of the divided value corresponding to the 4 MSBs, then 16 groups can be formed.

Figure 9:
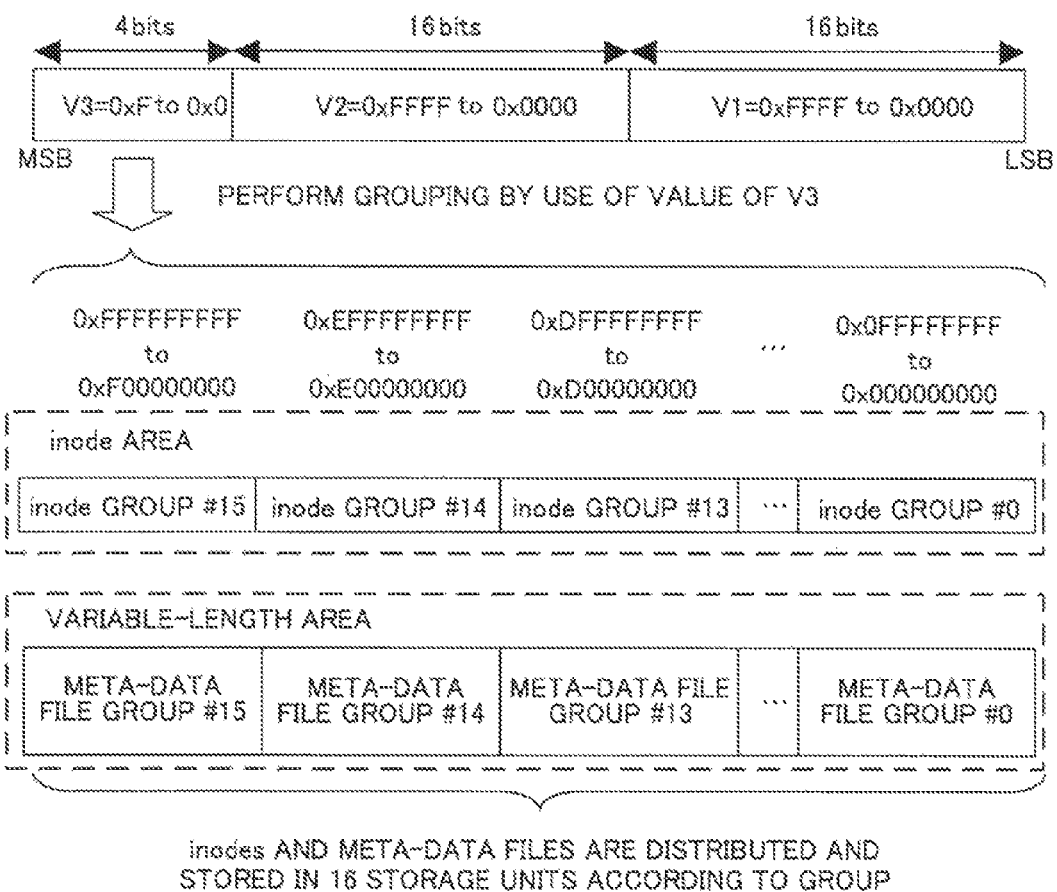
FIG. 9 illustrates an example of grouping performed by the use of a 4-bit divided value.

FIG. 9 illustrates an example of grouping performed by the use of a 4-bit divided value. In this example, the data length of an inode number is 36 bits. The inode number is divided into 4 bits (value "V3"), 16 bits (value "V2"), and 16 bits (value "V1") from the MSB side. It is assumed that grouping is performed by the use of the value "V3" on the MSB side. In this case, an inode area and a variable-length area are distributed and set in different storage units according to the 4-bit value "V3" on the MSB side of the inode number. For example, if an inode number is "0x123456789," then V3=0x1. A corresponding inode is stored in a storage unit assigned to the inode group #1. Meta-data corresponding to the inode the inode number of which is "0x123456789" is stored in a storage unit assigned to the meta-data file group #1.

Figure 10:
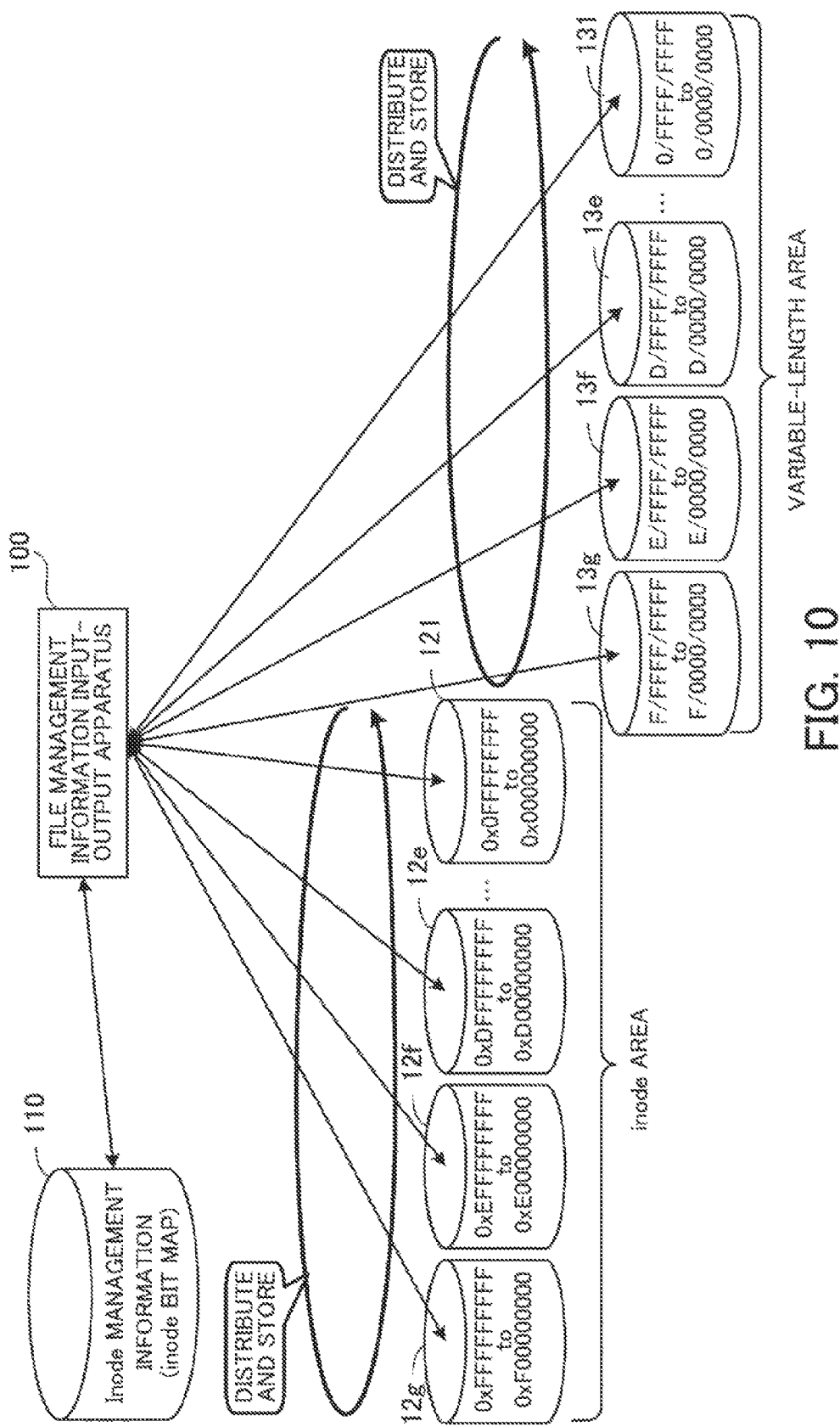
FIG. 10 illustrates an example of distribution and storage performed by the use of the 4 leading bits of an inode number.

FIG. 10 illustrates an example of distribution and storage performed by the use of the 4 leading bits of an inode number. In this case, one storage unit 110 is used as a storage area of inode management information. In addition, 16 storage units 121, . . . , 12e, 12f, and 12g are used as a storage area (inode area) for storing an inode. Furthermore, 16 storage units 131, . . . , 13e, 13f, and 13g are used as a storage area (variable-length area) for storing a meta-data file.

The file management information input-output apparatus 100 determines a storage unit in which the inode is to be stored on the basis of the 4 leading bits of an inode number. As a result, the inode is distributed and stored in the 16 storage units 121, . . . , 12e, 12f, and 12g. Similarly, the file management information input-output apparatus 100 determines a storage unit in which the meta-data file is to be stored on the basis of the 4 leading bits of the inode number. As a result, the meta-data file is distributed and stored in the 16 storage units 131, . . . , 13e, 13f, and 13g.

inodes are distributed in this way in a plurality of storage units. If accesses to a plurality of inodes occur at the same time, a conflict between accesses to the same storage unit is prevented and an I/O throughput improves. Similarly, meta-data except the inodes is distributed in the variable-length area corresponding to the inode number. As a result, a conflict between accesses to the same storage unit in which the meta-data is stored is prevented and an I/O throughput improves.

If inodes or meta-data except the inodes is distributed by the meta-data management section 141 on the basis of a divided value of an inode number, an inode number set for a file or a directory newly created is determined so that distribution and storage will be performed evenly. For example, the meta-data management section 141 determines an inode number so that a storage unit in which an inode corresponding to an inode number newly given is stored will be selected by the round robin scheduling from among the storage units used as the inode area. In addition, the meta-data management section 141 can give inode numbers to created files in ascending order by using a divided value on the LSB side of an inode number for grouping. By doing so, inodes or meta-data files are assigned to groups by the round robin scheduling. Furthermore, the meta-data management section 141 may determine an inode number so that a storage unit which stores an inode corresponding to an inode number newly given will be selected in random order from a plurality of storage units. Moreover, the meta-data management section 141 can determine an inode number by the use of a hash of data in an inode.

In order to manage a meta-data file in the hierarchical directory structure, the meta-data management section 141 can form the hierarchical directory structure by using each of the divided values Vn through V2 as a directory name. For example, if the inode number "0x012345678" is divided by the division method illustrated in FIG. 9, then the meta-data management section 141 uses V2=0x1234 as a directory name (/1234) and stores a meta-data file under it. In addition, in order to generate the file name of a meta-data file, the meta-data management section 141 uses V1=0x5678 as a prefix (character string at the beginning of the file name). The meta-data management section 141 uses a character string obtained by adding a type symbol indicative of the type of meta-data to this prefix value as the file name.

For example, it is assumed that a type symbol for a directory entry file is "D," that a type symbol for an ACL entry file is "A," and that a type symbol for an extended attribute file is "E." In the case of the above inode number, a pathname for an extended attribute meta-data file (extended attribute file) is "0/1234/5678E." A pathname for a directory entry meta-data file (directory entry file) is "0/1234/5678D." A pathname for an ACL entry meta-data file (ACL entry file) is "0/1234/5678A."

If the divided value Vn for the topmost hierarchy is used for grouping and the numeric value of Vn is used as a directory name, the names of topmost directories for all meta-data files are the same in the same storage unit. Accordingly, if the divided value Vn for the topmost hierarchy is used for grouping, a directory corresponding to the divided value Vn for the topmost hierarchy can be omitted at the time of generating a pathname used in a meta-data management file system. For example, if the inode number "0x012345678" is divided by the division method illustrated in FIG. 9, a pathname for an extended attribute meta-data file is "1234/5678E." In this case, the divided value Vn for the topmost hierarchy can be used as an identification number of a storage unit in which a meta-data group is stored.

Figure 11:
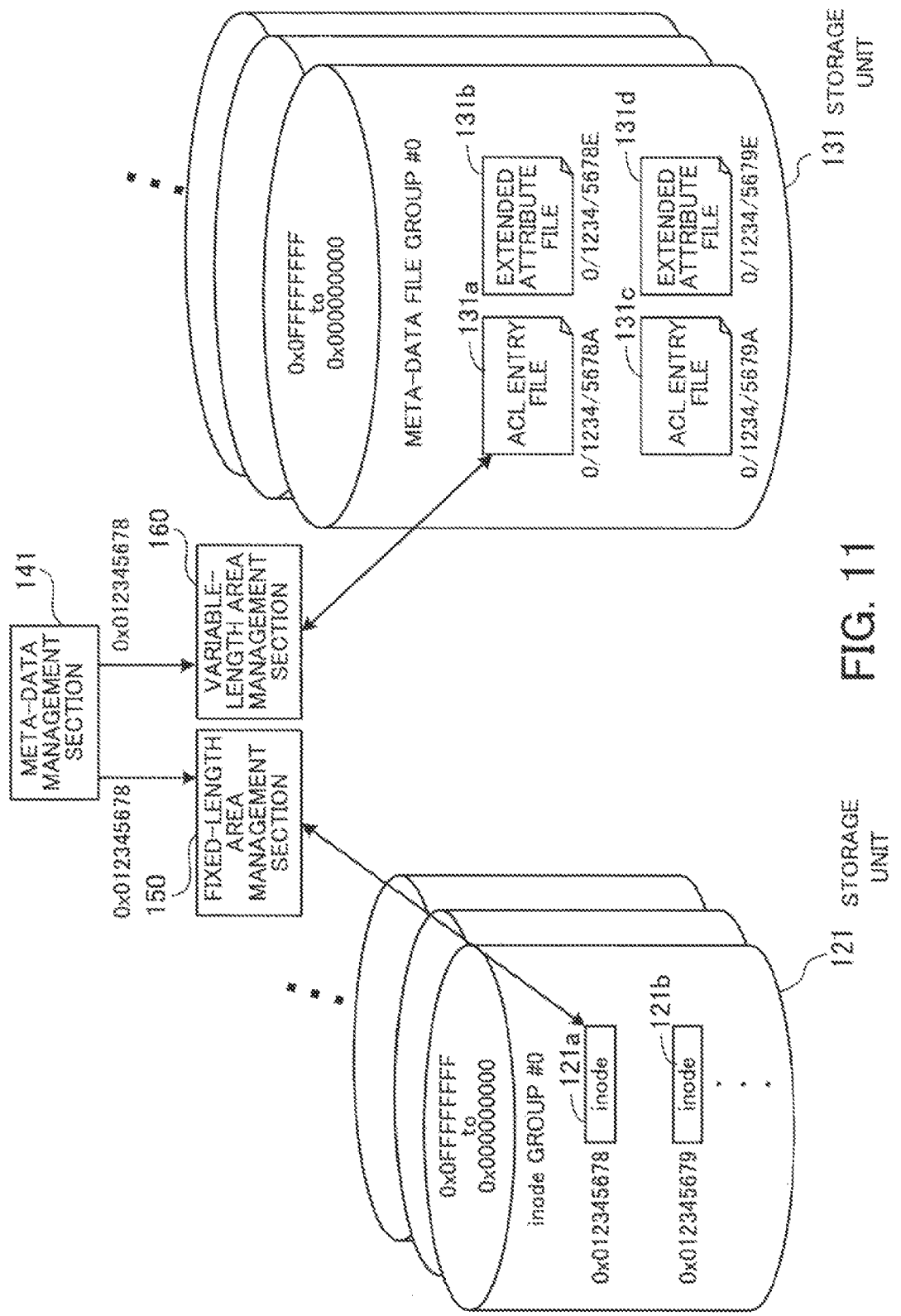
FIG. 11 illustrates an example of setting a pathname on the basis of an inode number.

FIG. 11 illustrates an example of setting a pathname on the basis of an inode number. In this example, it is assumed that a storage unit in which an inode is stored and a storage unit in which a meta-data file is stored are indicated by the 4 highest-order bits on the MSB side of an inode number. 16 bits which follow the 4 highest-order bits are the name of a directory to which the meta-data file belongs in the storage unit used as a variable-length area. The last 16 bits are a leading character string of the name of the meta-data file. A symbol indicative of a file type follows the leading character string of the name of each of meta-data files 131a, 131b, 131c, and 131d. In FIG. 11, a file identifier is indicated under each of the meta-data files 131a, 131b, 131c, and 131d by the use of its pathname (path to a directory and a file name).

For example, if an inode number is "0x012345678" or "0x012345679," then the value of the 4 highest-order bits is "0." Accordingly, inodes corresponding to these inode numbers belong to the inode group #0. As a result, the fixed-length area management section 150 stores an inode 121a the inode number of which is "0x012345678" or an inode 121b the inode number of which is "0x012345679" in the storage unit 121 assigned to the inode group #0.

Furthermore, if an inode number is "0x012345678" or "0x012345679," then the meta-data files 131a, 131b, 131c, and 131*d* corresponding to these inode numbers belong to the meta-data file group #0. As a result, the variable-length area management section 160 stores the meta-data files 131*a*, 131*b*, 131*c*, and 131*d* in the storage unit 131 assigned to the meta-data file group #0. At this time a total of 16 bits from the 5th bit to the 20th bit on the MSB side of each inode number represent a directory name. Therefore, the meta-data files 131*a*, 131*b*, 131*c*, and 131*d* are located in the directory "0/1234." In addition, the 16 lowest-order bits of each inode number represent a leading character string of a file name. The symbol "A" is given to an ACL entry file and the symbol "E" is given to an extended attribute file.

The variable-length area management section 160 accesses a meta-data file by the file system (meta-data management file system) included therein.

Figure 12:
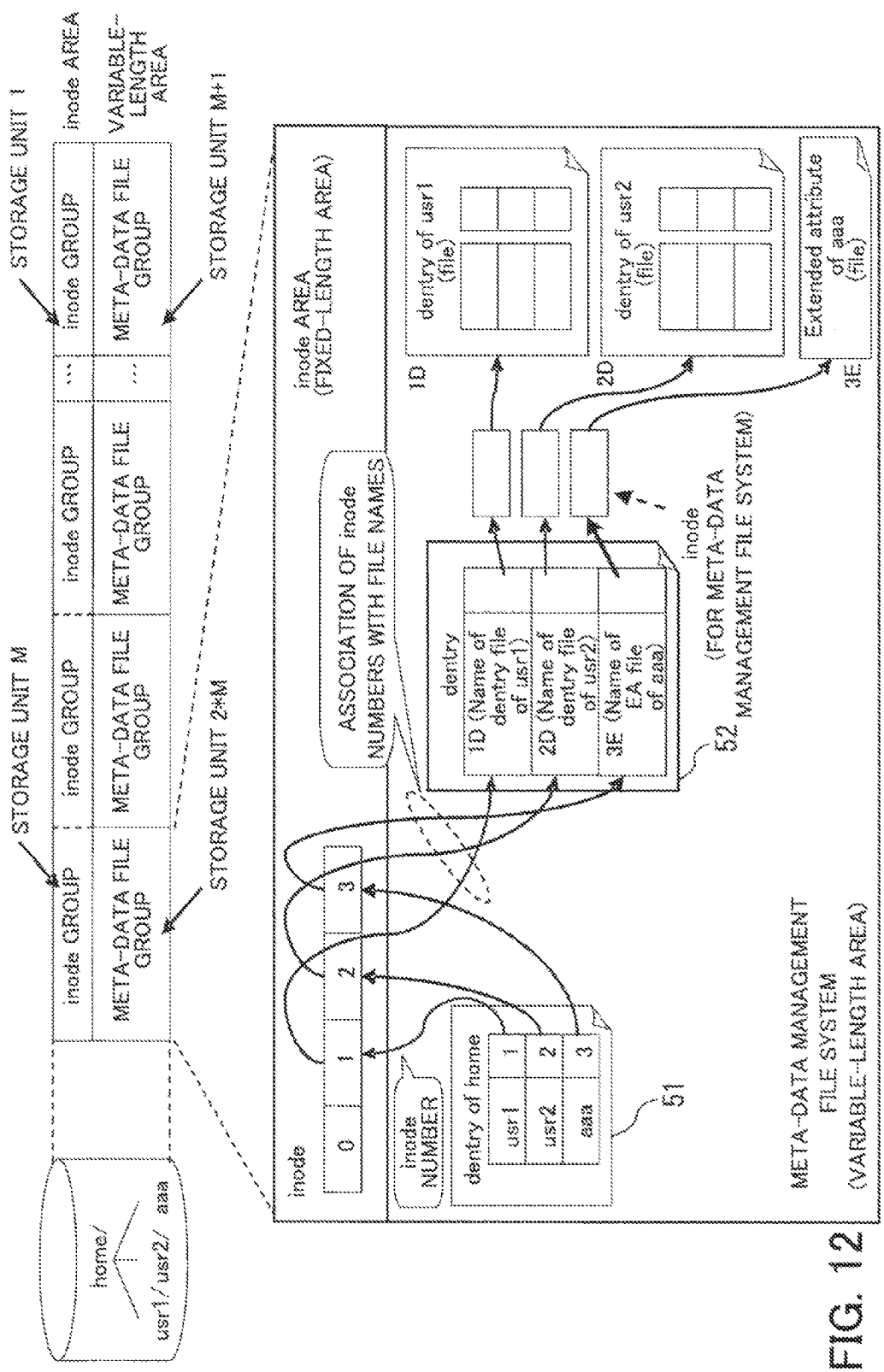
FIG. 12 illustrates an example of access to a meta-data file by a meta-data management file system.

FIG. 12 illustrates an example of access to a meta-data file by the meta-data management file system. In this example, it is assumed that many directories and files are located under the "home/" directory. An inode and a meta-data file of a directory or a file are distributed and stored in a plurality of storage units. It is assumed that meta-data files of the lower "usr1/" and "usr2/" directories and the "aaa" file under the "home/" directory are stored in the same storage units where a meta-data file of the "home/" directory is stored.

It is assumed that a directory entry file of "usr1/" is accessed by a command such as "ls." At this time the meta-data management section 141 is informed in advance of an inode number of the topmost "home/" directory. Accordingly, the meta-data management section 141 gives the variable-length area management section 160 instructions to acquire an inode number of "usr1/." The variable-length area management section 160 acquires a corresponding directory entry file 51 on the basis of the inode number of the "home/" directory and searches the directory entry file 51 for "usr1/." The variable-length area management section 160 acquires the inode number "1" from an entry which the search hits, and passes it to the meta-data management section 141.

The meta-data management section 141 designates the inode number acquired and requests the fixed-length area management section 150 to acquire an inode. The fixed-length area management section 150 then acquires the inode corresponding to the inode number from a fixed-length area and passes it to the meta-data management section 141. In addition, the meta-data management section 141 designates the file name "1D" of a directory entry file based on the inode number acquired, and requests the variable-length area management section 160 to acquire a file. The variable-length area management section 160 then acquires a directory entry file of a root directory of a storage unit which stores the file. The variable-length area management section 160 searches the acquired directory entry file for the file name "1D" and acquires an inode number indicated in an entry which the search hits. The meta-data management file system which manages the storage unit to be accessed uses this inode number for management. The variable-length area management section 160 acquires an inode on the basis of the acquired inode number. A location (such as a block number) in a storage unit where a file corresponding to the acquired inode is stored, file size, and the like are set in the acquired inode. The variable-length area management section 160 acquires the file (directory entry file) the name of which is "1D" on the basis of the acquired inode and passes it to the meta-data management section 141.

Different file systems can manage the variable-length area in this way. As a result, the number of files which the entire system illustrated in FIG. 2 can manage increases. For example, if one meta-data management file system can treat a 32-bit inode number, then 4G ($2^{32}$) files can be stored in storage units assigned to one meta-data file group. If a file group is identified by a 4-bit divided value of an inode number, then a meta-data file is distributed in 16 storage units. Accordingly, the entire system illustrated in FIG. 2 can manage a 36-bit inode number, that is to say, 64G ($2^{36}$) files.

A file system, such as ext2 or ext3, can be used as a meta-data management file system. The maximum number of files which a file system, such as ext2 or ext3, can manage is 4G. By applying this embodiment, however, files the number of which exceeds the upper limit of 4G can be created and managed.

A procedure for each process performed in response to an access request from the user application 210 will now be described with reference to FIGS. 13 and 14. In an example illustrated in FIGS. 13 and 14, it is assumed that a pathname for a file to be opened is "/foo/bar."

Figure 13:
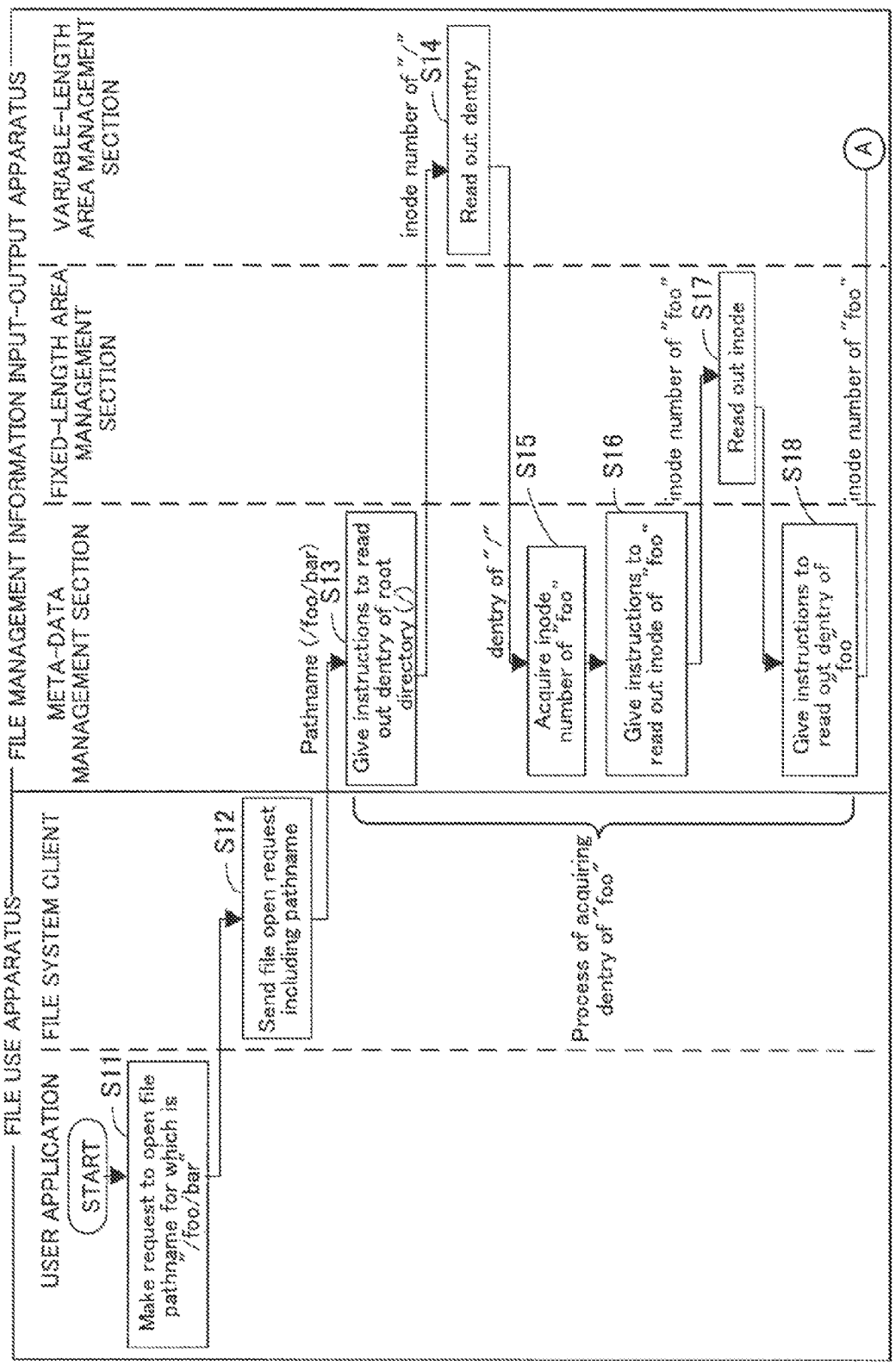
FIG. 13 is a sequence diagram of the first half of a file open process.

FIG. 13 is a sequence diagram of the first half of a file open process. The process illustrated in FIG. 13 will now be described in order of step number.

(Step S11) The user application 210 of the file use apparatus 200 outputs a request to open a file for which the pathname "/foo/bar" is designated. This file open request is passed to the file system client 221 of the file use apparatus 200.

(Step S12) The file system client 221 sends the file management information input-output apparatus 100 the file open request including the pathname.

The file management information input-output apparatus 100 which receives the file open request including the pathname first performs the process of acquiring a directory entry (dentry) file of the "foo" directory. Step S13 through step S19 (see FIG. 14) correspond to the process of acquiring a directory entry file of the "foo" directory.

(Step S13) The meta-data management section 141 of the file management information input-output apparatus 100 receives the file open request including the pathname from the file use apparatus 200. The meta-data management section 141 then gives the variable-length area management section 160 instructions to read out a directory entry file of a root directory (/).

(Step S14) The variable-length area management section 160 reads out the corresponding directory entry (dentry) meta-data file from a storage unit on the basis of an inode number of the root directory. The variable-length area management section 160 then sends the meta-data management section 141 the directory entry file of the root directory.

(Step S15) The meta-data management section 141 searches the directory entry file of the root directory and acquires an inode number of the "foo" directory.

(Step S16) The meta-data management section 141 gives the fixed-length area management section 150 instructions to read out an inode corresponding to the inode number of the "foo" directory from the fixed-length area.

(Step S17) The fixed-length area management section 150 reads out the inode corresponding to the inode number of the "foo" directory from the fixed-length area and passes it to the meta-data management section 141.

(Step S18) The meta-data management section 141 recognizes from information indicative of a file type included in the inode read out that "foo" is a directory. Accordingly, the meta-data management section 141 gives the variable-length area management section 160 instructions to read out a directory entry meta-data file of the "foo" directory. After that, step S19 (see FIG. 14) is performed.

Figure 14:
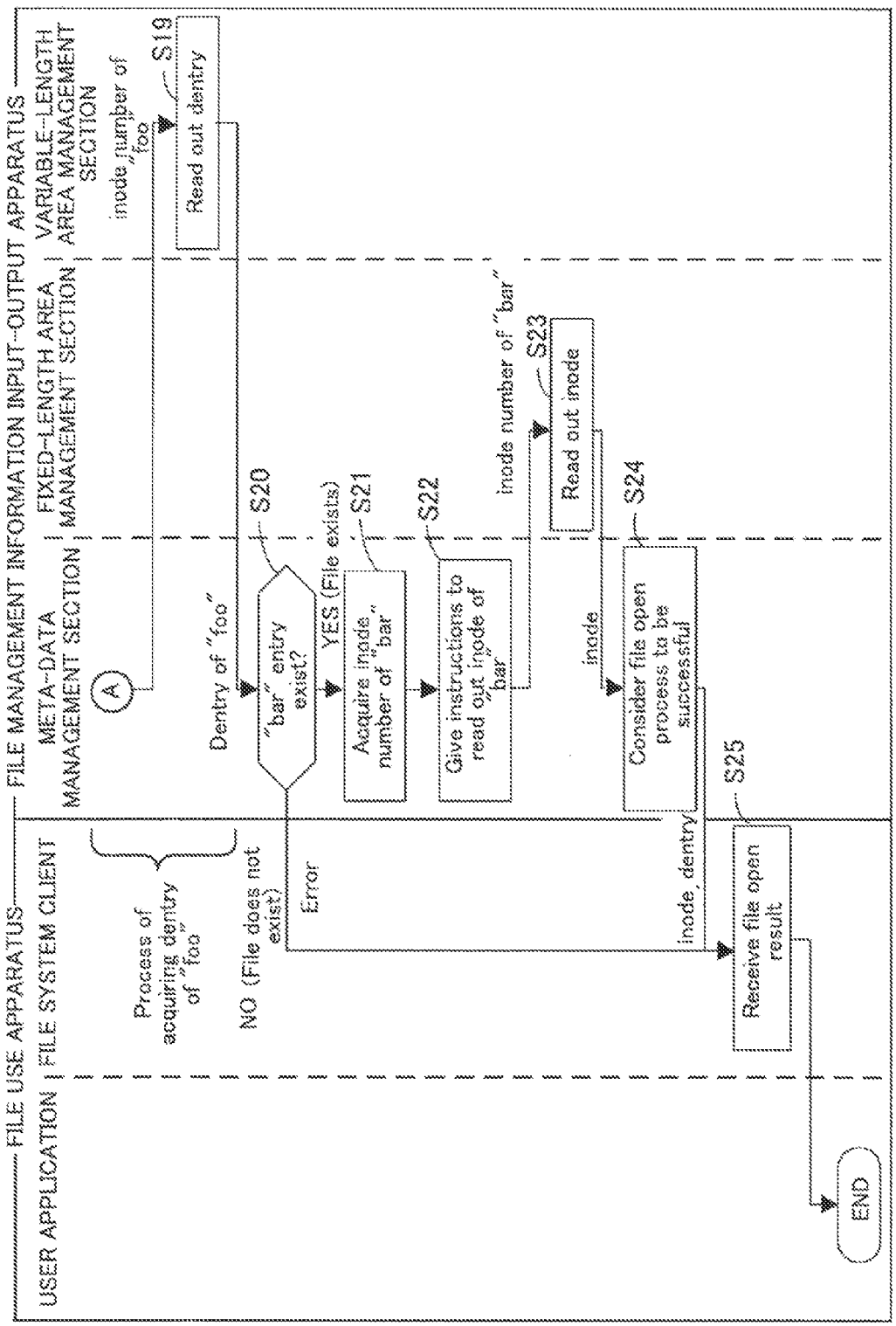
FIG. 14 is a sequence diagram of the second half of the file open process.

FIG. 14 is a sequence diagram of the second half of the file open process. The process illustrated in FIG. 14 will now be described in order of step number.

(Step S19) The variable-length area management section 160 reads out a corresponding directory entry (dentry) meta-data file from a storage unit on the basis of the inode number of the "foo" directory. The variable-length area management section 160 then sends the meta-data management section 141 the directory entry file of the "foo" directory.

(Step S20) The meta-data management section 141 searches the directory entry file of the "foo" directory for the file name "bar" and determines whether the "bar" entry exists. If the "bar" entry exists, then step S21 is performed. If the "bar" entry does not exist, then the meta-data management section 141 determines that the designated file does not exist, and returns the error "file does not exist" to the file use apparatus 200.

(Step S21) If the "bar" entry exists, then the meta-data management section 141 acquires an inode number of "bar."

(Step S22) The meta-data management section 141 gives the fixed-length area management section 150 instructions to read out an inode corresponding to the inode number of "bar" from the fixed-length area.

(Step S23) The fixed-length area management section 150 reads out the inode corresponding to the inode number of "bar" from the fixed-length area and passes it to the meta-data management section 141.

(Step S24) The meta-data management section 141 considers the file open process to be successful, and returns the inode of "bar" and the directory entry file of the "foo" directory to the file use apparatus 200.

(Step S25) When the meta-data management section 141 succeeds in opening the file, the file system client 221 of the file use apparatus 200 receives the inode and the directory entry file from the file management information input-output apparatus 100 as a result of the file open request. When the meta-data management section 141 fails in opening the file, the file system client 221 of the file use apparatus 200 receives the error from the file management information input-output apparatus 100 as a result of the file open request. The result of the file open process is sent from the file system client 221 to the user application 210 and the file open process ends.

The file open process is performed in this way in response to the request from the user application 210. With the file open process, the inode is acquired from the fixed-length area and the dentry is acquired from the variable-length area. In this embodiment the fixed-length area and the variable-length area are set in different storage units. Accordingly, when the file open process is performed, access to a plurality of storage units is performed. Distributed access is performed in this way, so the file open process is made efficient.

The process of creating a new file will now be described with reference to FIGS. 15 and 16. In an example illustrated in FIGS. 15 and 16, it is assumed that a file a pathname for which is "/foo/bar" is created.

Figure 15:
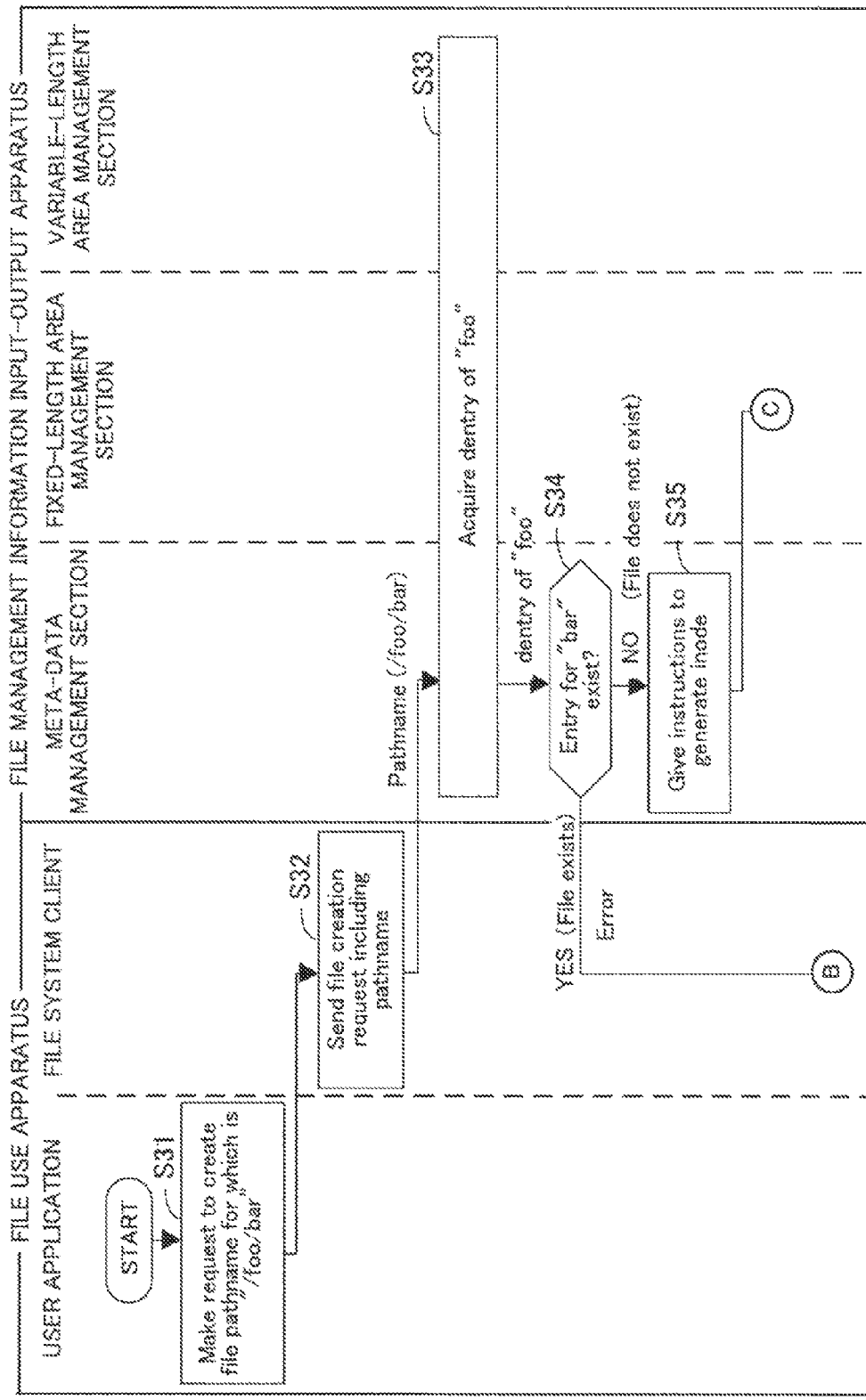
FIG. 15 is a sequence diagram of the first half of a file creation process.

FIG. 15 is a sequence diagram of the first half of a file creation process. The process illustrated in FIG. 15 will now be described in order of step number.

(Step S31) The user application 210 of the file use apparatus 200 outputs a request to create a file for which the pathname "/foo/bar" is designated. This file creation request is passed to the file system client 221 of the file use apparatus 200.

(Step S32) The file system client 221 sends the file management information input-output apparatus 100 the file creation request including the pathname.

(Step S33) The file management information input-output apparatus 100 which receives the file creation request including the pathname first performs the process of acquiring a directory entry (dentry) file of the "foo" directory. The details of this process are the same as step S13 through step S19 illustrated in FIGS. 13 and 14.

(Step S34) When the meta-data management section 141 acquires the directory entry file of the "foo" directory, the meta-data management section 141 determines whether an entry for the "bar" file to be created is included in the acquired directory entry file. If an entry for the "bar" file to be created is included in the acquired directory entry file, then the meta-data management section 141 determines that it has failed in creating the file. Step 40 (see FIG. 16) is then performed. If an entry for the "bar" file to be created is not included in the acquired directory entry file, then the meta-data management section 141 determines that there is no existing file. Step S35 is then performed.

(Step S35) The meta-data management section 141 gives the fixed-length area management section 150 instructions to generate an inode of the "bar" file. After that, step S36 (see FIG. 16) is performed.

Figure 16:
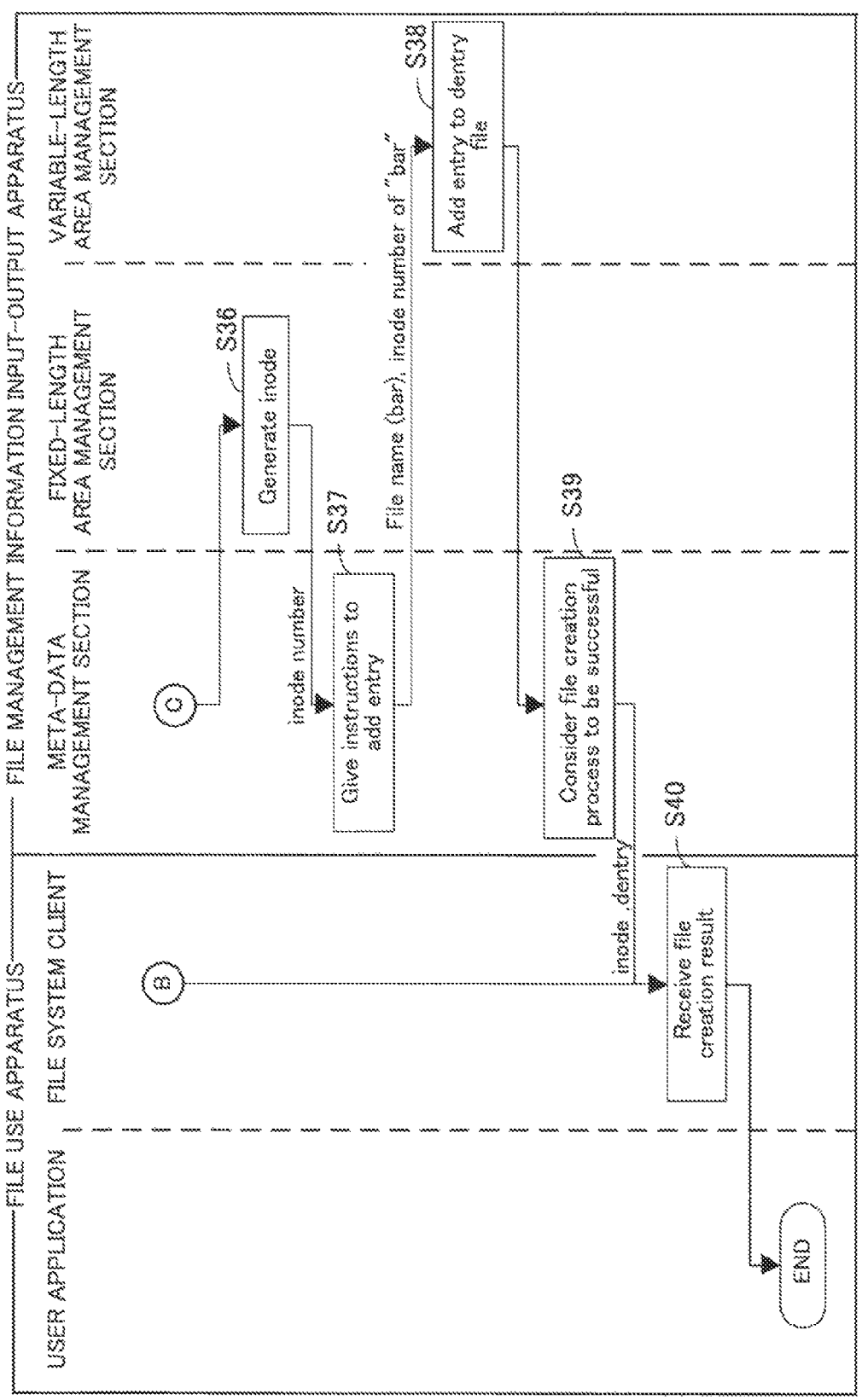
FIG. 16 is a sequence diagram of the second half of the file creation process.

FIG. 16 is a sequence diagram of the second half of the file creation process. The process illustrated in FIG. 16 will now be described in order of step number.

(Step S36) The fixed-length area management section 150 generates the inode of the "bar" file in accordance with the instructions to generate an inode of the "bar" file, and returns the inode generated and an inode number to the meta-data management section 141.

(Step S37) The meta-data management section 141 designates the file name "bar" and the inode number of the "bar" file and gives the variable-length area management section 160 instructions to add an entry to the directory entry (dentry) file of the "foo" directory.

(Step S38) The variable-length area management section 160 adds the file name "bar" and the inode number of the "bar" file to the directory entry file of the "foo" directory in accordance with the instructions to add an entry. The variable-length area management section 160 then returns the directory entry file to which the entry has been added to the meta-data management section 141.

(Step S39) The meta-data management section 141 considers the file creation process to be successful, and sends the file use apparatus 200 the inode generated and the directory entry file of the "foo" directory after the update.

(Step S40) When the meta-data management section 141 succeeds in creating the file, the file system client 221 of the file use apparatus 200 receives the inode and the directory entry (dentry) file from the file management information input-output apparatus 100 as a result of the file creation request. When the meta-data management section 141 fails in creating the file, the file system client 221 of the file use apparatus 200 receives an error from the file management information input-output apparatus 100 as a result of the file creation request. The result of the file creation process is then sent from the file system client 221 to the user application 210 and the file creation process ends.

The file creation process is performed in this way in response to the request from the user application 210. With the file creation process, the inode is generated in the fixed-length area and the entry is added to the dentry in the variable-length area. In this embodiment the fixed-length area and the variable-length area are set in different storage units. Accordingly, when the file creation process is performed, access to a plurality of storage units is performed. Distributed access is performed in this way, so the file creation process is made efficient.

The process of storing extended attribute information will now be described with reference to FIGS. 17 and 18. In an example illustrated in FIGS. 17 and 18, it is assumed that extended attribute information for a file a pathname for which is "/foo/bar" is stored. At this time it is assumed that an inode number of the file to which an extended attribute is given is known. For example, it is assumed that the process of storing extended attribute information is performed in a state in which an inode number is acquired by a file open process or a new file creation process.

Figure 17:
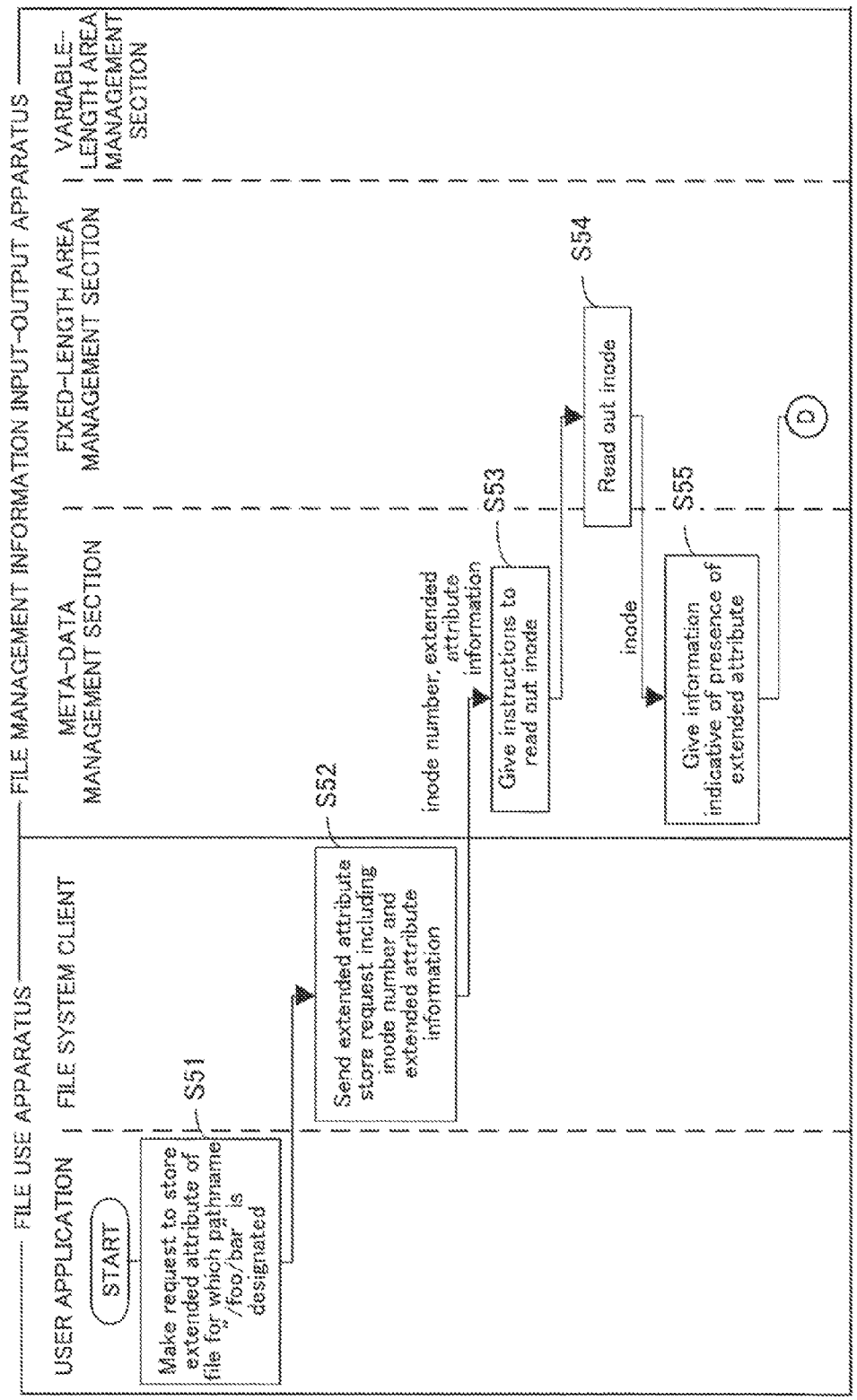
FIG. 17 is a sequence diagram of the first half of an extended attribute information store process.

FIG. 17 is a sequence diagram of the first half of an extended attribute information store process. The process illustrated in FIG. 17 will now be described in order of step number.

(Step S51) The user application 210 of the file use apparatus 200 outputs a request to store an extended attribute of a file for which the pathname "/foo/bar" is designated. This extended attribute store request is passed to the file system client 221 of the file use apparatus 200.

(Step S52) The file system client 221 sends the file management information input-output apparatus 100 the extended attribute store request including an inode number and extended attribute information.

(Step S53) The meta-data management section 141 of the file management information input-output apparatus 100 receives the extended attribute store request including the inode number and the extended attribute information from the file use apparatus 200. The meta-data management section 141 then gives the fixed-length area management section 150 instructions to read out an inode corresponding to the inode number designated in the extended attribute store request.

(Step S54) The fixed-length area management section 150 reads out the inode corresponding to the designated inode number from a storage unit used as the fixed-length area, and passes it to the meta-data management section 141.

(Step S55) When the meta-data management section 141 acquires the inode, the meta-data management section 141 gives information (such as a flag) indicative of the presence of the extended attribute to the inode. The meta-data management section 141 then gives the fixed-length area management section 150 instructions to write the inode after the update. After that, step S56 (see FIG. 18) is performed.

Figure 18:
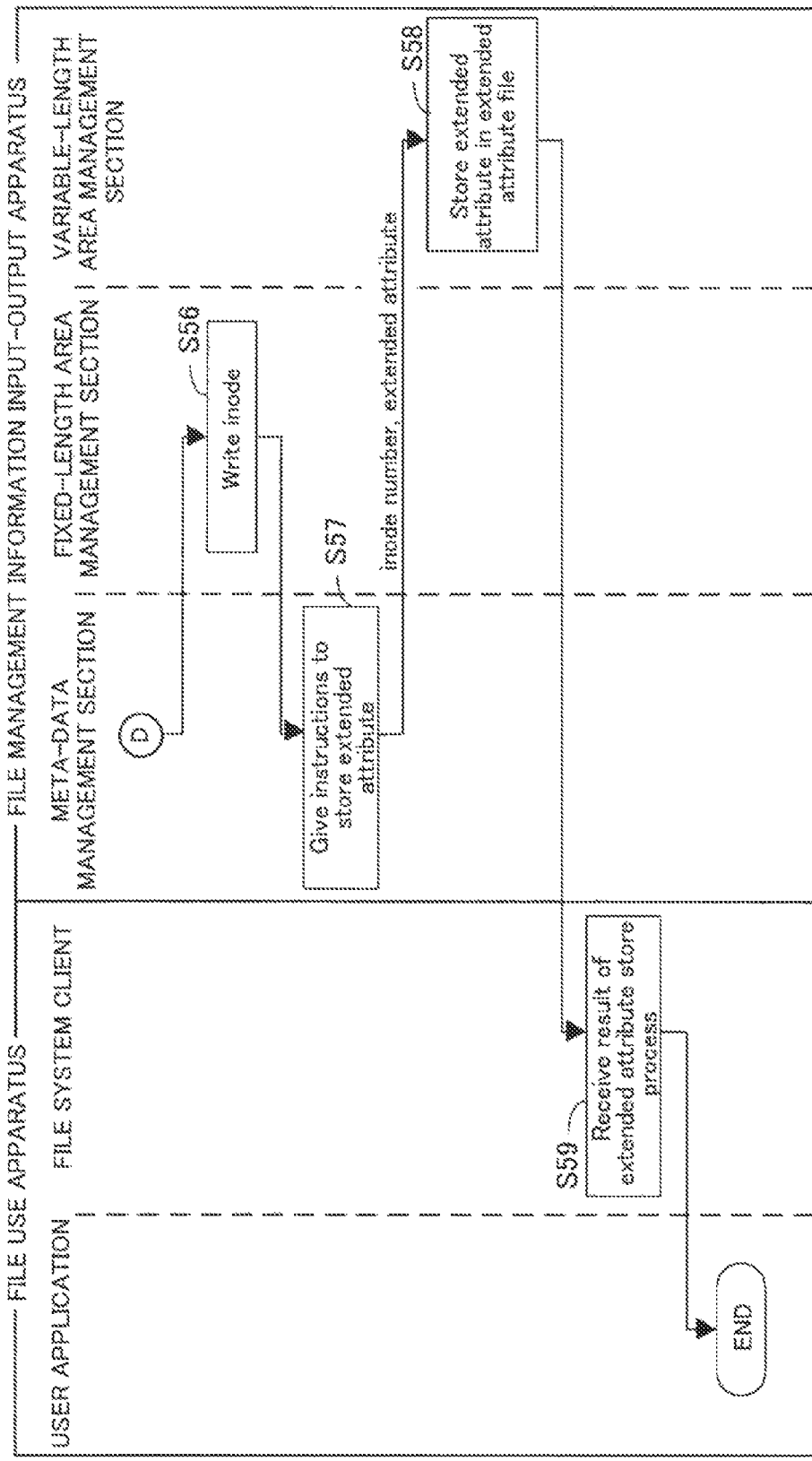
FIG. 18 is a sequence diagram of the second half of the extended attribute information store process.

FIG. 18 is a sequence diagram of the second half of the extended attribute information store process. The process illustrated in FIG. 18 will now be described in order of step number.

(Step S56) The fixed-length area management section 150 stores the inode after the update in the fixed-length area in accordance with the instructions from the meta-data management section 141. The fixed-length area management section 150 then sends the meta-data management section 141 a response which is indicative that writing the inode has been completed.

(Step S57) The meta-data management section 141 sends the variable-length area management section 160 the inode number and the extended attribute and gives the variable-length area management section 160 instructions to store the extended attribute.

(Step S58) The variable-length area management section 160 stores the extended attribute in an extended attribute file corresponding to the inode number designated in the variable-length area. The variable-length area management section 160 then sends the file use apparatus 200 via the meta-data management section 141 a response which is indicative that storing the extended attribute has been completed.

(Step S59) The file system client 221 of the file use apparatus 200 receives a response to the effect that storing the extended attribute has been completed from the file management information input-output apparatus 100. The result of the extended attribute store process is sent from the file system client 221 to the user application 210 and the extended attribute store process ends.

The extended attribute store process is performed in this way in response to the request from the user application 210. With the extended attribute store process, the inode in the fixed-length area is updated and the extended attribute file in the variable-length area is updated. In this embodiment the fixed-length area and the variable-length area are set in different storage units. Accordingly, when the extended attribute store process is performed, access to a plurality of storage units is performed. Distributed access is performed in this way, so the extended attribute store process is made efficient.

The process of reading out an extended attribute will now be described with reference to FIG. 19. In an example illustrated in FIG. 19, it is assumed that an extended attribute of a file a pathname for which is "/foo/bar" is read out. At this time it is assumed that an inode number of the file of which an extended attribute is acquired is known. For example, it is assumed that the process of reading out an extended attribute is performed in a state in which an inode number is acquired by a file open process or a new file creation process.

Figure 19:
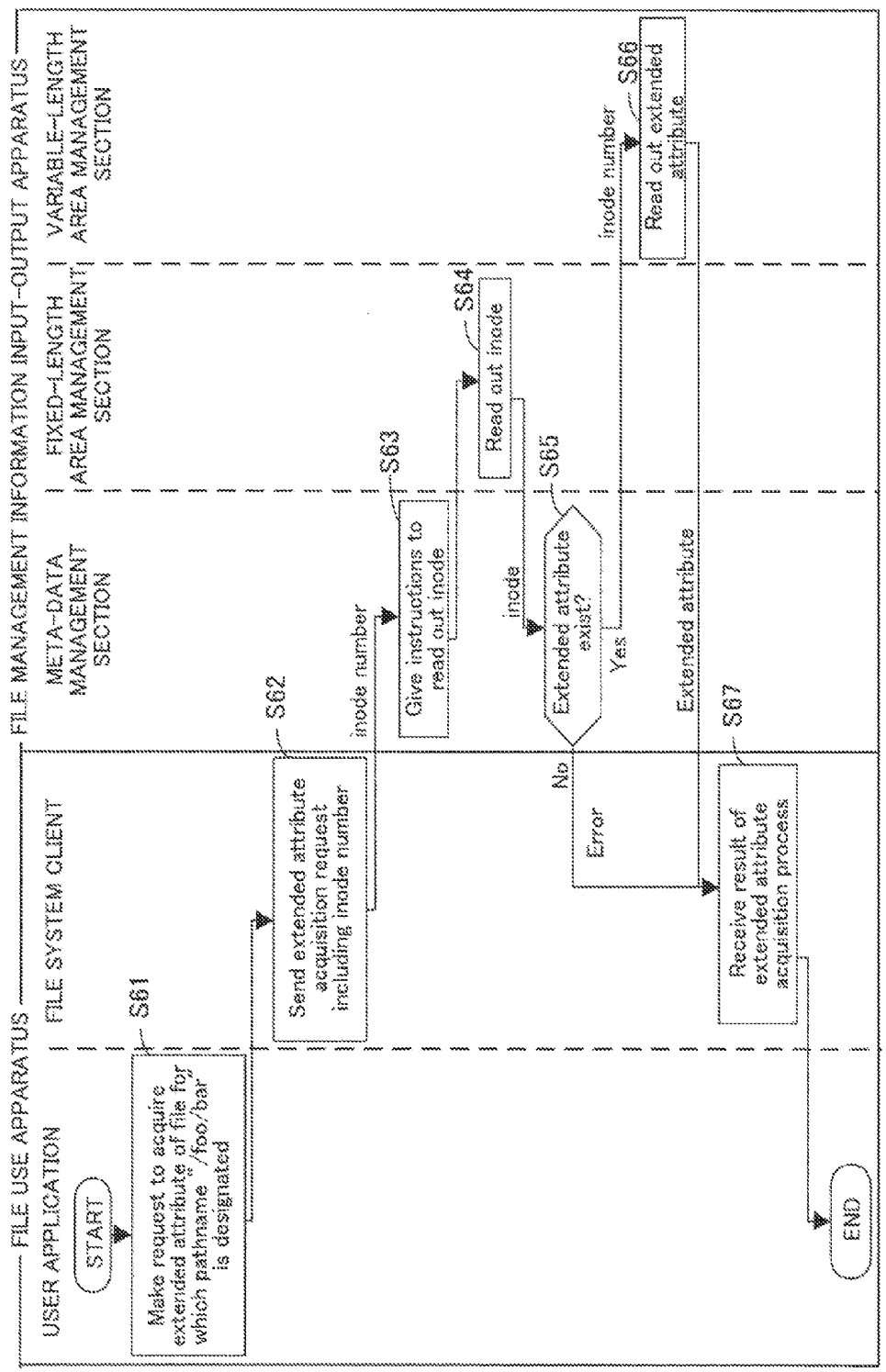
FIG. 19 is a sequence diagram of an extended attribute read process.

FIG. 19 is a sequence diagram of an extended attribute read process. The process illustrated in FIG. 19 will now be described in order of step number.

(Step S61) The user application 210 of the file use apparatus 200 outputs a request to acquire an extended attribute of a file for which the pathname "/foo/bar" is designated. This extended attribute acquisition request is passed to the file system client 221 of the file use apparatus 200.

(Step S62) The file system client 221 sends the file management information input-output apparatus 100 the extended attribute acquisition request including an inode number and extended attribute information.

(Step S63) The meta-data management section 141 of the file management information input-output apparatus 100 receives the extended attribute acquisition request including the inode number from the file use apparatus 200. The meta-data management section 141 then gives the fixed-length area management section 150 instructions to read out an inode corresponding to the inode number designated in the extended attribute acquisition request.

(Step S64) The fixed-length area management section 150 reads out the inode corresponding to the designated inode number from a storage unit used as the fixed-length area, and passes it to the meta-data management section 141.

(Step S65) When the meta-data management section 141 acquires the inode, the meta-data management section 141 checks whether information (such as a flag) indicative of the presence of an extended attribute is given to the inode. By doing so, the meta-data management section 141 determines whether an extended attribute exists. If an extended attribute does not exist, then the meta-data management section 141 informs the file use apparatus 200 that an error has occurred. After that, step S67 is performed. If an extended attribute exists, then the meta-data management section 141 designates the inode number and gives the variable-length area management section 160 instructions to read out the extended attribute.

(Step S66) The variable-length area management section 160 reads out the extended attribute from an extended attribute file in the variable-length area corresponding to the inode number designated. The variable-length area management section 160 then sends the file use apparatus 200 via the meta-data management section 141 the extended attribute read out.

(Step S67) The file system client 221 of the file use apparatus 200 receives notice of the error or the extended attribute read out from the file management information input-output apparatus 100 as a result of the extended attribute acquisition process. The result of the extended attribute acquisition process is sent from the file system client 221 to the user application 210 and the extended attribute acquisition process ends.

The extended attribute acquisition process is performed in this way in response to the request from the user application 210. With the extended attribute acquisition process, the inode is read out from the fixed-length area and the extended attribute is read out from the extended attribute file in the variable-length area. In this embodiment the fixed-length area and the variable-length area are set in different storage units. Accordingly, when the extended attribute acquisition process is performed, access to a plurality of storage units is performed. Distributed access is performed, so the extended attribute acquisition process is made efficient.

As has been described, in the second embodiment meta-data except an inode is managed by a meta-data file the size of which is variable. Accordingly, the size of a meta-data file can be increased at need and the extensibility of a file system improves. With the conventional file system "ext3," for example, the limit of one block is imposed on ACL information for a file and the number of access rights which can be set is limited to 32. In the second embodiment many access rights can be set without limit. As a result, convenience improves in a large-scale file system which a large number of people use.

In addition, the inode management area, the inode area, and the variable-length area are set in different storage units. Accordingly, when meta-data is inputted or outputted in response to one request, access to a plurality of storage units is performed and access efficiency improves.

Furthermore, inodes are divided into a plurality of groups and these groups are stored in different storage units. Therefore, even if attention is paid only to access to the inodes, distributed access is performed and access efficiency improves. Similarly, meta-data except the inodes is divided into a plurality of groups and these groups are stored in different storage units. As a result, efficiency in access to the meta-data except the inodes improves. With a large-scale computer system such as a supercomputer, for example, an increase in the number of computers is proportional to an increase in the number of users and many open requests are made to a file system. If many open requests for many files are made in succession, storage units to be accessed are distributed. As a result, the number of times an open process is performed in the unit time increases and an open process response improves.

Moreover, a meta-data file which stores meta-data except an inode is managed in a directory structure hierarchically formed by the use of a value obtained by bit-dividing an inode number. Accordingly, a meta-data file can be specified uniquely by an inode number. This makes meta-data management and search easy. Even if plural kinds of meta-data except an inode is managed, each meta-data file can be identified easily by adding a character indicative of a file type to a file name.

In the second embodiment in particular an inode number is divided by determined bit width from the MSB side into n divided values Vn through V1. A character string indicative of the divided value V1 on the LSB side is used as a file name. A hierarchical directory structure in which character strings indicative of the divided values Vn through V2 are used in order from the MSB side as directory names is formed. By doing so, meta-data except an inode can be managed more easily.

At this time an arbitrary divided value Vk of the divided values Vn through V2 is used as the unit of grouping and inodes are divided into groups by the use of the divided value Vk. Therefore, the inodes and meta-data except the inodes are divided into groups the number of which corresponds to the number of possible values of the divided value Vk. These groups are stored in different storage units. Part of the inode number is used in this way for grouping. By doing so, the meta-data can be distributed evenly in a plurality of storage units and access to the meta-data can be distributed evenly among storage units the number of which corresponds to the number of possible values of the divided value Vk.

In addition, the meta-data except the inodes is written to meta-data files and is managed by the meta-data file. As a result, meta-data file groups can be managed by different file systems. That is to say, even if there is an upper limit to the number of files which each file system can manage, the number of meta-data files which belong to the same meta-data file group should be made smaller than or equal to the upper limit. If a plurality of meta-data file groups are formed, an entire system can manage a large number of files above the upper limit of the number of files which a file system that manages each meta-data file group can treat. For example, if the meta-data management file system included in the variable-length area management section 160 is ext2 or ext3, then the maximum number of files is 4G. However, if meta-data files are distributed and stored in 16 storage units, then 64G files can be managed.

(Other Applications)

In the above embodiment the variable-length area is managed by different file systems and extended attribute information is written to files. By doing so, the size of meta-data such as the extended attribute information is made variable. However, if the size of meta-data such as the extended attribute information can be made variable, it is not necessary that the extended attribute information should take the form of a file.

In the above embodiment the number of the storage units set as the inode area and the number of the storage units set as the variable-length area are the same. However, it is not necessary that the number of storage units set as the inode area and the number of storage units set as the variable-length area should be the same. For example, it is possible that inodes are distributed and stored in 16 storage units by the use of the 4 highest-order bits of an inode number and that meta-data files are distributed and stored in 32 storage units by the use of the 5 highest-order bits of the inode number.

In the above embodiment the inode number is divided into divided values by a bit number counted from the MSB side of the data indicative of the inode number. However, an inode number may be divided by a bit number counted from the LSB side of data indicative of the inode number. Furthermore, a divided value used for grouping inodes or meta-data files may not be bits on the MSB side. For example, several bits on the LSB side may be used as a divided value for grouping.

The above functions can be realized with a computer. In this case, a program in which the contents of the functions the file management information storage apparatus 1 or the file management information input-output apparatus 100 should have are described is provided. By executing this program on the computer, the above functions are realized on the computer. This program can be recorded on a computer readable record medium. A computer readable record medium can be a magnetic storage device, an optical disk, a magneto-optical recording medium, a semiconductor memory, or the like. A magnetic storage device can be a hard disk drive (HDD), a flexible disk (FD), a magnetic tape, or the like. An optical disk can be a DVD, a DVD-RAM, a CD-ROM, a CD-R/RW, or the like. A magneto-optical recording medium can be a magneto-optical disk (MO) or the like.

To place the program on the market, portable record media, such as DVDs or CD-ROMs, on which it is recorded are sold. Alternatively, the program is stored in advance on a hard disk in a server computer and is transferred from the server computer to another computer via a network.

When the computer executes this program, it will store the program, which is recorded on a portable record medium or which is transferred from the server computer, on, for example, its hard disk. Then the computer reads the program from its hard disk and performs processes in compliance with the program. The computer can also read the program directly from a portable record medium and perform processes in compliance with the program. Furthermore, each time the program is transferred from the server computer, the computer can perform processes in turn in compliance with the program it receives.

In addition, at least part of the above functions can be realized with an electronic circuit such as a DSP (Digital Signal Processor), an ASIC (Application Specific Integrated Circuit), or a PLD (Programmable Logic Device).

The embodiments have been described in the foregoing. However, the structure of each section indicated in each embodiment can be replaced with another section having the same function. In addition, any other section or process may be added to each embodiment. Furthermore, the structure (features) of the above embodiments may be combined.

The data size of extended management information for a file becomes variable and the extensibility of a file management function improves.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A file management information storage apparatus for inputting and outputting file management information, the file management information storage apparatus comprising:
    a storage unit having a fixed-length area that stores plural pieces of fixed-length data and a variable-length area that stores plural pieces of variable-length data;
    a file management section that accepts an input-output request for the file management information;
    a fixed-length area management section that inputs and outputs basic management information as fixed-length data for managing a file corresponding to the input-output request to and from the fixed-length area of the storage unit on the basis of the input-output request accepted by the file management section; and
    a variable-length area management section that inputs and outputs extended management information as variable-length data for managing the file corresponding to the input-output request to and from the variable-length area of the storage unit on the basis of the input-output request accepted by the file management section.

2. The file management information storage apparatus according to claim 1, wherein:
    the fixed-length area management section divides the plural pieces of basic management information into a plurality of basic management information groups and stores the plurality of basic management information groups in one or more storage units according to the basic management information group, respectively; and
    the variable-length area management section divides the plural pieces of extended management information into a plurality of extended management information groups and stores the plurality of extended management information groups in one or more storage units according to the extended management information group, respectively.

3. The file management information storage apparatus according to claim 2, wherein:
    the storage unit stores a file to which the extended management information is written in the variable-length area; and
    the variable-length area management section manages the one or more storage units that store the plurality of extended management information groups according to extended management information group, respectively.

4. The file management information storage apparatus according to claim 1, wherein:
    the storage unit stores a file to which the extended management information is written in the variable-length area; and
    a directory name and a file name for specifying the file are generated on the basis of basic management information corresponding to the extended management information and are hierarchical.

5. The file management information storage apparatus according to claim 4, wherein:
    the fixed-length area management section divides an identification number of the basic management information into a first divided value through an nth divided value (n is a positive integer) from a most significant bit side or a least significant bit side; and
    the file management section generates the hierarchical directory name on the basis of the second divided value through the nth divided value and generates the file name on the basis of the first divided value.

6. The file management information storage apparatus according to claim 5, wherein the fixed-length area management section divides the plural pieces of basic management information into a plurality of basic management information groups with pieces of basic management information to which identification numbers in which a numeric value indicated by a kth divided value (k is an integer and satisfies $2 \leq k \leq n$) of the first divided value through the nth divided value is the same are given considered to belong to a same basic management information group.

7. A method for controlling a file management information storage apparatus for inputting and outputting file management information, the method comprising:
    ensuring a fixed-length area that stores plural pieces of fixed-length data and a variable-length area that stores plural pieces of variable-length data in a storage unit included in the file management information storage apparatus;
    accepting an input-output request for the file management information by a processor included in the file management information storage apparatus;
    inputting and outputting basic management information as fixed-length data for managing a file corresponding to the input-output request to and from the fixed-length area of the storage unit by the processor on the basis of the input-output request accepted; and inputting and outputting extended management information as variable-length data for managing the file corresponding to the input-output request to and from the variable-length area of the storage unit by the processor on the basis of the input-output request accepted.

8. The method according to claim 7, further comprising:

dividing plural pieces of basic management information into a plurality of basic management information groups by the processor;

storing the plurality of basic management information groups in one or more storage units according to basic management information group by the processor;

dividing plural pieces of extended management information into a plurality of extended management information groups by the processor; and storing the plurality of extended management information groups in one or more storage units according to extended management information group by the processor.

9. The method according to claim 8, wherein:

the storage unit stores a file to which the extended management information is written is stored in the variable-length area of the storage unit; and the one or more storage units that store the plurality of extended management information groups according to extended management information group are managed according to extended management information group by the processor, respectively.

10. The method according to claim 7, wherein:

a file to which the extended management information is written is stored in the variable-length area of the storage unit; and a directory name and a file name for specifying the file are generated on the basis of basic management information corresponding to the extended management information and are hierarchical.

11. The method according to claim 10, further comprising:

dividing an identification number of the basic management information into a first divided value through an nth divided value (n is a positive integer) from a most significant bit side or a least significant bit side by the processor; and generating the hierarchical directory name on the basis of the second divided value through the nth divided value and generating the file name on the basis of the first divided value by the processor.

12. The method according to claim 11, further comprising dividing the plural pieces of basic management information into a plurality of basic management information groups with pieces of basic management information to which identification numbers in which a numeric value indicated by a kth divided value (k is an integer and satisfies 2≦k≦n) of the first divided value through the nth divided value is the same are given considered to belong to a same basic management information group by the processor.

13. A non-transitory computer-readable record medium storing a program for directing an operation processing unit included in a file management information storage apparatus to perform a process for inputting and outputting file management information, the process comprising:

ensuring a fixed-length area that stores plural pieces of fixed-length data and a variable-length area that stores plural pieces of variable-length data in a storage unit included in the file management information storage apparatus;

accepting an input-output request for the file management information;

inputting and outputting basic management information as fixed-length data for managing a file corresponding to the input-output request to and from the fixed-length area of the storage unit on the basis of the input-output request accepted; and inputting and outputting extended management information as variable-length data for managing the file corresponding to the input-output request to and from the variable-length area of the storage unit on the basis of the input-output request accepted.

14. The non-transitory computer-readable record medium according to claim 13, the process further comprising:

dividing plural pieces of basic management information into a plurality of basic management information groups;

storing the plurality of basic management information groups in one or more storage units according to basic management information group;

dividing plural pieces of extended management information into a plurality of extended management information groups; and storing the plurality of extended management information groups in one or more storage units according to extended management information group.

15. The non-transitory computer-readable record medium according to claim 14, wherein:

the storage unit stores a file to which the extended management information is written in the variable-length area; and the process further directs the operation processing unit to manage the one or more storage units that store the plurality of extended management information groups according to extended management information group by the use of file systems according to extended management information group, respectively.

16. The non-transitory computer-readable record medium according to claim 13, wherein:

a file to which the extended management information is written is stored in the variable-length area of the storage unit; and a directory name and a file name for specifying the file are generated on the basis of basic management information corresponding to the extended management information and are hierarchical.

17. The non-transitory computer-readable record medium according to claim 16, the process further comprising:

dividing an identification number of the basic management information into a first divided value through an nth divided value (n is a positive integer) from a most significant bit side or a least significant bit side; and generating the hierarchical directory name on the basis of the second divided value through the nth divided value and generate the file name on the basis of the first divided value.

18. The non-transitory computer-readable record medium according to claim 17, the process further directing the operation processing unit to divide the plural pieces of basic management information into a plurality of basic management information groups with pieces of basic management information to which identification numbers in which a numeric value indicated by a kth divided value (k is an integer and satisfies 2≦k≦n) of the first divided value through the nth divided value is the same are given considered to belong to a same basic management information group.

* * * * *